United States Patent
Bernlind et al.

(10) Patent No.: US 12,221,581 B2
(45) Date of Patent: Feb. 11, 2025

(54) PROCESS FOR ONE-STEP CONVERSION OF LIGNOCELLULOSIC MATERIAL TO HYDROCARBON PRODUCTS AND CATALYST FOR USE IN SAID PROCESS

(71) Applicant: RISE RESEARCH INSTITUTES OF SWEDEN AB, Borås (SE)

(72) Inventors: Christian Bernlind, Södertälje (SE); Martin Hedberg, Södertälje (SE)

(73) Assignee: RISE RESEARCH INSTITUTES OF SWEDEN AB, Borås (SE)

( * ) Notice: Subject to any disclaimer, the term of this patent is extended or adjusted under 35 U.S.C. 154(b) by 0 days.

(21) Appl. No.: 18/044,586

(22) PCT Filed: Aug. 24, 2021

(86) PCT No.: PCT/EP2021/073367
§ 371 (c)(1),
(2) Date: Mar. 9, 2023

(87) PCT Pub. No.: WO2022/058128
PCT Pub. Date: Mar. 24, 2022

(65) Prior Publication Data
US 2023/0365869 A1    Nov. 16, 2023

(30) Foreign Application Priority Data
Sep. 18, 2020    (SE) ................... 2051093-9

(51) Int. Cl.
*B01J 23/94*    (2006.01)
*B01J 27/051*   (2006.01)
*B01J 27/30*    (2006.01)
*B01J 35/30*    (2024.01)
*B01J 37/20*    (2006.01)
(Continued)

(52) U.S. Cl.
CPC ............ *C10G 1/086* (2013.01); *B01J 27/051* (2013.01)

(58) Field of Classification Search
CPC ........ B01J 23/883; B01J 23/94; B01J 27/043; B01J 27/051; B01J 27/30; B01J 37/20; B01J 38/48; B01J 35/30; C10G 1/06; C10G 1/086; C10G 2300/1014; Y02E 50/10; Y02P 30/20
See application file for complete search history.

(56) References Cited

FOREIGN PATENT DOCUMENTS

EP    3010996 B1    4/2016
JP    4560749 B2 * 10/2010 ............. B01J 27/04
(Continued)

OTHER PUBLICATIONS

JP-4560749-B2 English Translation; Oct. 2010.*
(Continued)

*Primary Examiner* — Ellen M McAvoy
*Assistant Examiner* — Chantel Graham
(74) *Attorney, Agent, or Firm* — Ballard Spahr LLP

(57) ABSTRACT

A lignocellulosic starting material can be converted into an aqueous phase and a hydrocarbon phase in a one-step process by subjecting a mixture of the lignocellulosic starting material, an amorphous and unsupported sulfided nickel-molybdenum catalyst, and optionally a co-feed, to not less than a stoichiometric amount of hydrogen, elevated pressure and a temperature in the interval of 350-450° C. A novel catalyst for use in said process and a method for its production are also disclosed.

21 Claims, 12 Drawing Sheets

(51) Int. Cl.
  *B01J 38/48* (2006.01)
  *C08L 97/02* (2006.01)
  *C10G 1/06* (2006.01)
  *C10G 1/08* (2006.01)
  *C10G 45/00* (2006.01)
  *C10G 45/50* (2006.01)
  *C10G 47/06* (2006.01)

(56) References Cited

FOREIGN PATENT DOCUMENTS

| WO | WO-2011038911 A1 * | 4/2011 | ............ B01J 23/85 |
| WO | WO 2013/072391 A1 | 5/2013 | |

OTHER PUBLICATIONS

Burton, A., et al. "Catalytic Hydroliquefaction of Lignocellulosic Biomass" Int. J. Solar Energy, 1986, vol. 4, No. 2, pp. 67-80.
Grange, P., et al. "Catalytic Hydrodesulfurization" Catal. Rev.—Sci.Eng., 1980, vol. 21, No. 1, pp. 135-181.
Thakur, D. S. et al. "A Comparison of some Catalytic, Structural and Textural Properties of Unsupported MoS2 and WS2 Hydrodesulfurization catalysts promoted by Group VIII Metals" J. Less Common Met., 1979, vol. 64, pp. 201-211.
Thakur, D. S. et al. "Catalytic and Physico-Chemical Properties of Unsupported Nickel Sulfide-Molybdenum Sulfide Catalysts" Bull. Soc. Chim. Belg., 1977, vol. 86, No. 6, pp. 413-418.
Yoosuk, B. et al. "Hydrodeoxygenation of oleic acid and palmitic acid to hydrocarbon-like biofuel over unsupported Ni—Mo and Co—Mo sulfide catalysts" Renew. Energy, 2019, Aug., vol. 139, pp. 1391-1399.
Itthibenchapong, V. et al. "A facile and low-cost synthesis of MOS2 for hydrodeoxygenation of phenol" Catal. Commun., 2015, Aug., vol. 85, pp. 31-35.
Yi, Y., et al. "Preparations of unsupported Ni—Mo—S catalysts for hydrodesulfurization of dibenzothiophene by thermal decomposition of tetramethylammonium thiomolybdates" Catal. Today, 2011, Oct., vol. 175, No. 1, pp. 460-466.
Tran, C, et al. "Unsupported transition metal-catalyzed hydrodeoxygenation of guaiacol" Catal. Commun., 2017, Nov., vol. 101, pp. 71-76.
De Brimont M.R., et al: "Deoxygenation mechanisms on Ni-promoted MoSbulk catalysts: a combined experimental and theoretical study", Journal of Catalysis, Academic Press, Duluth, MN, US, vol. 286, Oct. 23, 2011, pp. 153-164.
Yoosuk, B. et al. "Amorphous unsupported NiMo sulfide prepared by one step hydrothermal method for phenol hydrodeoxygenation", Fuel, vol. 91, No. 1, Aug. 2, 2012, pp. 246-252.
International Search Report and Written Opinion were mailed on Nov. 22, 2021 by the International Searching Authority for International Application No. PCT/EP2021/073367 filed on Aug. 24, 2021 (Rise Research Institutes of Sweden AB) (15 pages).
Swedish Search Report was mailed on Mar. 24, 2021 by the Swedish Patent Office for Swedish Application No. 2051093-9 filed on Sep. 18, 2020 (Applicant-Rise Research Institutes of Sweden AB) (9 pages).

* cited by examiner

PROCESS FOR ONE-STEP CONVERSION OF LIGNOCELLULOSIC MATERIAL TO HYDROCARBON PRODUCTS AND CATALYST FOR USE IN SAID PROCESS

CROSS-REFERENCE TO RELATED APPLICATIONS

This application is a U.S. National Phase Application of International Application No. PCT/EP2021/073367, filed Aug. 24, 2021, which claims priority to Swedish Application No. 2051093-9, filed Sep. 18, 2020, each of which are hereby incorporated by reference in their entirety.

TECHNICAL FIELD

The present disclosure relates to a novel process to directly convert solid lignocellulosic raw materials to liquid hydrocarbon products, a novel sulfided nickel-molybdenum catalyst for use in said process, and methods for the production of said catalyst.

BACKGROUND

Since the onset of the industrial revolution, hydrocarbon fuels have been used in order to generate energy for heating, for power and propulsion, and for the generation of electricity. This has resulted in growing $CO_2$ emissions, with $CO_2$ accumulating in the atmosphere to an extent that influences the global climate. Fossil i.e. non-renewable hydrocarbons are currently the main source of hydrocarbon fuels. However, renewable alternative energy sources (such as fuel cells, photovoltaics, wind power, biofuels etc.) are under constant development, for both propulsion and for the generation of electricity. Similarly, a high number of cogeneration power plants are in operation and have a long remaining technical lifespan. Additionally, the global infrastructure for the production, distribution and use of hydrocarbon fuels, is well-developed and far-reaching. Consequently, the cost of prematurely replacing existing equipment such as boilers, generators, engines and vehicles would be extremely high, and therefore significantly reduces the incentive to adapt new technology.

Thus, any major change of technology platform, such as the rollout of wind power, photovoltaics, and for example the introduction of electric cars, will only slowly decrease the global consumption of hydrocarbon fuels. The introduction of renewable hydrocarbon fuels would however be likely to meet less resistance, and thus offer a possibility to curb $CO_2$ emissions faster and at a lower cost than more disruptive technology shifts. Initially, renewable hydrocarbon fuels could be blended into fossil fuels in increasing amounts until a full conversion is possible.

It is well known that thermochemical methods like pyrolysis and hydrothermal liquefaction (HTL) can depolymerize whole lignocellulosic biomass as well as lignocellulosic biomass fractionation products like kraft lignin and other renewable side streams from agriculture, forestry and the paper and pulping industry, often producing liquefied products collectively referred to as "bio-oils" or "biocrude". These can then be upgraded further using hydrotreatment and hydrocracking technologies more or less similar to the ones used to upgrade fossil crude oil and its distillates in oil refineries, to obtain mixtures of hydrocarbons which can be used as for instance transport fuel components.

Commercial scale production of hydrocarbons via pyrolysis or HTL and subsequent upgrading using hydrotreatment and hydrocracking is at present for various reasons however not in place, in favor of more easily processed renewable feedstocks like fats and mixtures of renewable fatty acids. The latter raw materials, which due to their relatively low oxygen content and lipophilic nature are freely miscible with crude oil distillates, can be processed either alone or co-processed with fossil feedstocks using process technology adapted for the current oil refinery infrastructure. Fats and fatty acids are, although global production has increased over the last decades, however not produced in amounts which match the amounts needed to replace fossil feedstocks for transport fuel manufacture. In addition, using vegetable oils and other fats produced from agriculture may compete with the production of food and feed. This has resulted in regulations for the use of these raw materials, for instance in the European Union, EU. Consequently, more facile processes for converting also lignocellulosic feedstocks to hydrocarbon fuels appear necessary to reach well motivated societal and environmental sustainability goals.

Problems frequently encountered in thermochemical liquefaction (pyrolysis or HTL) of biomass include for example a relatively high oxygen content and a spontaneously reactive nature of the resulting depolymerized product mixture, containing among other different structural classes of molecules, reactive phenol derivatives in combination with aldehydes and ketones, which together cause more or less severe repolymerization during storage and/or heating. Other issues are for example the formation of char and a loss of high-volatility organic components, resulting in eventually lower carbon yields of hydrocarbon fuel components after upgrading than desirable.

One example of further issues is a high content of water in the resulting products. In addition, this water is often very difficult or impossible to remove by phase separation due to the polar nature of many of the organic components in the bio-oils. Distillation to remove water is precluded by the lack of stability during heating due to the repolymerization issue mentioned above. Further, the high content of water, in combination with the acidic nature of bio-oils, creates a situation where the bio-oils are highly corrosive to standard construction materials used in refinery upgrading equipment. To illustrate with figures, pyrolytic degradation of lignocellulosic materials results in an oxygen content in the condensable fractions in the range of 20→40%. The same condensable fractions usually have pH-values of around 2-3 as a result of a high content of carboxylic acids and water. Overall, this means that the total oxygen and water content are not significantly lower than in the more stable non-depolymerized, dried but otherwise non-treated and considerably less acidic lignocellulosic biomass.

Summarizing the above, pyrolysis or HTL consequently, although the goal of obtaining a pumpable liquid bio-oil is often achieved, yield bio-oil or biocrude products which are both corrosive and unstable for storage and heating due to issues with spontaneous repolymerization. Additionally, these products display poor or no miscibility with fossil or other renewable feedstocks of interest for facile and flexible co-processing in current standard refinery infrastructure. These properties are obviously problematic when developing practical robust full-scale processes for direct conversion of pyrolysis and/or HTL bio-oils both individually and through co-processing to hydrocarbon transport fuels and chemicals.

Concerning hydrotreatment/hydrocracking catalysts which can be used to upgrade fully and/or partly renewable feedstocks and feedstock mixtures, there are a large number of different base metal and noble metal catalysts published in the literature, which have been used to more or less successfully upgrade bio-oils or other materials derived from lignocellulose to hydrocarbon-rich product mixtures. These catalysts can either be based on single metals or consist of combinations of different metals or metal compounds which are either supported on chemically inert or reactive support materials or not.

This in combination with a limited understanding about the more precise mechanisms for the reactions taking place in the upgrading processes, makes it very difficult to select suitable catalysts for each particular feedstock mixture to be upgraded. Supported catalysts are mainly and naturally used when processing liquid homogeneous feedstock mixtures in for instance fixed bed plug flow reactors. For hydrotreatment and/or hydrocracking processes using other types of reactors like continuous stirred tank reactors and other constructions, catalysts and any solid feed components are continuously pumped together with liquid co-feeds as a slurry into the reactor in what is called a slurry hydrocracking or slurry hydrotreatment process. Catalysts for the latter type of process may be both supported or non-supported, soluble homogeneous or heterogeneous metal catalysts. It can be fairly concluded that there exists no clear and unambiguous guidance for catalyst design and optimization.

In summary, there is a demand for improved simple and robust processes, which can be applied to a commercially relevant selection of lignocellulosic raw materials and which are amenable for upscaling. These and other objectives will be apparent from the summary and the descriptions of certain embodiments below. It will be understood by those skilled in the art that one or more aspects can meet certain objectives, while one or more other aspects can meet certain other objectives.

SUMMARY

The present disclosure makes available a new process and a new catalyst for use in said process, as well as a method for manufacture of said catalyst. According to a first aspect, this process for the conversion of lignocellulosic starting materials into an aqueous phase and a hydrocarbon phase is characterized in that a lignocellulosic starting material, either from a single source or from a mixture of relevant starting materials, an amorphous and unsupported sulfided nickel-molybdenum catalyst, and optionally a co-feed, are mixed and subjected to not less than a stoichiometric amount of hydrogen, elevated pressure and a temperature in the interval of 350-450° C., producing an aqueous phase and a hydrocarbon phase.

In exemplary embodiments, the content of sulfur (S) in the amorphous and unsupported sulfided nickel-molybdenum catalyst with respect to the content of molybdenum (Mo) is from 0.1 to 1.0.

For example, the content of sulfur (S) in the amorphous and unsupported sulfided nickel-molybdenum catalyst with respect to the content of molybdenum (Mo) is from 0.1 to below 1.0. In embodiments, the content of sulfur (S) is from 0.3 to 0.99, e.g. from 0.5 to 0.95.

In exemplary embodiments, the content of nickel (Ni) in the amorphous and unsupported sulfided nickel-molybdenum catalyst with respect to the content of molybdenum (Mo) is from 0.1 to 0.2.

Preferably said catalyst is introduced into the mixture of lignocellulosic starting materials in the form of a slurry of catalyst particles in a hydrocarbon co-feed. In the alternative, the catalyst and co-feed are added separately.

According to an embodiment of said first aspect, a co-feed is present and said co-feed is chosen from vegetable oils and fats, liquid hydrocarbons, and/or a re-circulated product obtained in said process.

In exemplary embodiments, the co-feed is a mixture of a vegetable oil, e.g. rapeseed oil, and a fossil or renewable hydrocarbon, e.g. diesel.

Hydrogenated triglyceride fats from vegetable oils and animal fats may also be used in the co-feed.

According to another embodiment, freely combinable with the above aspect and embodiments, the lignocellulosic starting material is chosen from wood chips and/or saw dust with a dry content of >50%; forestry residue chosen from bark, and/or roots, and/or branches with a dry content of >50%; wood having been subjected to drying or a torrefaction process; lignocellulose from agriculture like for example straw from crops like oats, wheat, barley and rye, corn stover, grasses and herbs, forage crops, oat husks, rice husks, construction waste containing at least 50% originating from lignocellulosic matter; and mixtures thereof.

According to another embodiment, also freely combinable with the above aspect and embodiments, the lignocellulosic starting material has not been subjected to thermochemical treatment, such as pyrolysis or hydrothermal liquefaction, prior to being subjected to said process. Accordingly, a more simplified process can be achieved.

In exemplary embodiments, no co-feed is present in the process.

In exemplary embodiments, the hydrocarbon phase has an oxygen content of less than 2.5% by weight.

According to yet another embodiment, also freely combinable with the above aspect and embodiments, the operating pressure is in an interval of 60-300 bar.

A second aspect of the present disclosure relates to a nickel-molybdenum sulfide catalyst, characterized in that said catalyst has the empirical formula with regard to molybdenum (Mo), nickel (Ni) and sulfur (S):

$$Mo_xNi_yS_z$$

wherein x=1, 0.1<y<0.2 and z≤1.0.

Preferably said catalyst is substantially amorphous as determined by X-ray powder diffraction analysis and optical microscopy using polarized light.

According to an embodiment of said second aspect, said catalyst has a particle size distribution with a median value of 1-50 μm as determined by laser diffraction.

A third aspect of the present disclosure relates to a process for the conversion of lignocellulosic starting materials into an aqueous phase and a hydrocarbon phase, characterized in that a mixture of lignocellulosic starting materials, a catalyst according to the second aspect and embodiments thereof, and optionally a co-feed, is subjected to not less than a stoichiometric amount of hydrogen, elevated pressure and a temperature in the interval of 350-450° C., producing an aqueous phase and a hydrocarbon phase.

A fourth aspect relates to a process of producing a catalyst according to the second aspect and embodiments thereof, comprising the steps of forming a first reaction mixture by mixing $MoO_3$, $(NH_4)_2S$, and water;

pressurizing said first mixture using hydrogen gas, heating and stirring the mixture;

forming a second mixture by adding a hydrocarbon fraction having a kinematic viscosity of less than 2.0 CSt @40° C. and $NiSO_4$ (aq.) at a suitable pressure and temperature;

pressurizing said second mixture with hydrogen gas and heating it using a suitable temperature ramp;

depressurizing said second mixture and heating the residual hydrocarbon to a suitable temperature to remove water and part of the hydrocarbon fraction; and recovering the catalyst in the form of a slurry with residual hydrocarbon.

Further aspects and embodiments will become apparent to a person skilled in the art upon study of the figures and the following detailed description and examples.

SHORT DESCRIPTION OF THE DRAWINGS

The aspects and embodiments will now be described, by way of example, with reference to the accompanying drawings, in which:

FIG. 1 schematically shows a set-up for a continuous process utilizing the principles set out in the present disclosure.

FIG. 2 schematically shows a process for the production of a catalyst as disclosed herein.

DETAILED DESCRIPTION

Figure 1:
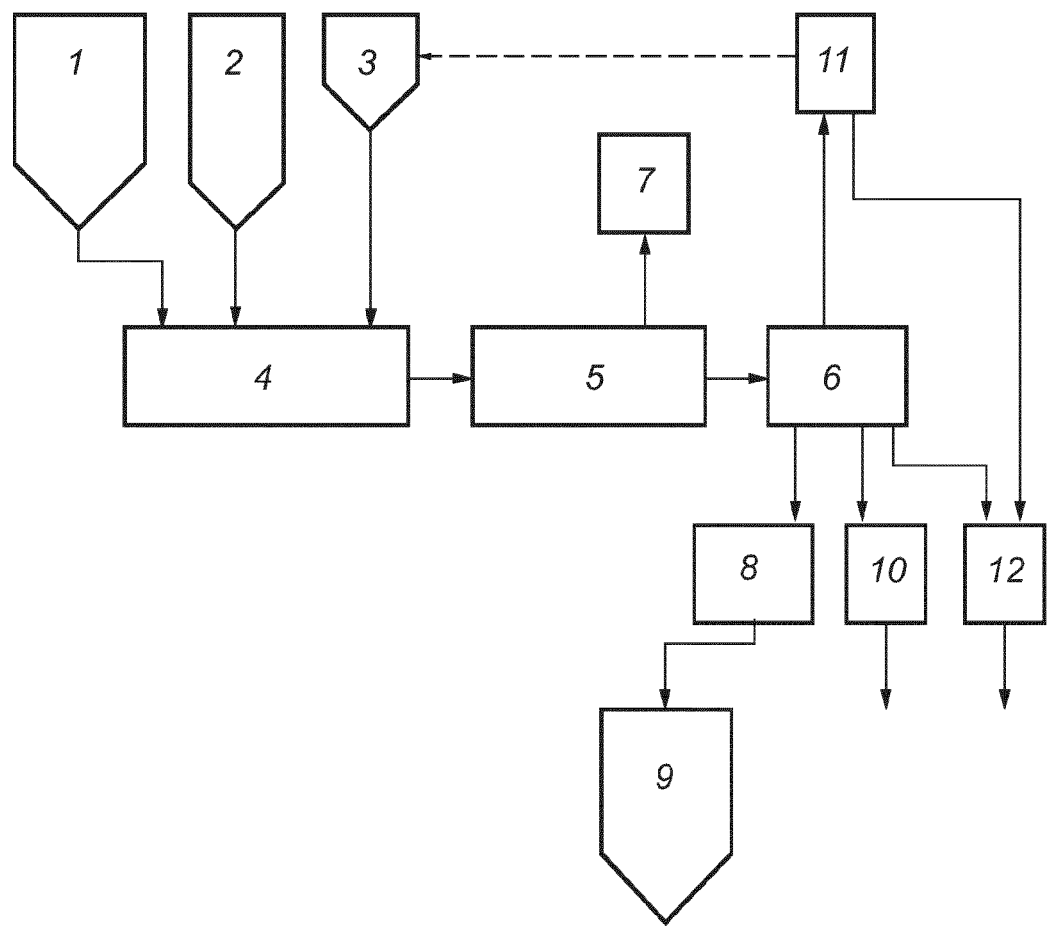

When studying the detailed description, it is to be understood that the terminology employed herein is used for the purpose of describing particular embodiments only and is not intended to be limiting, since the scope of the present aspects and embodiments will be limited only by the appended claims and equivalents thereof.

It should be noted that, as used in this specification and the appended claims, the singular forms "a," "an," and "the" include plural referents unless the context clearly dictates otherwise.

The terms "lignocellulosic materials", "lignocellulosic starting materials" and "lignocellulosic feed" are used herein to encompass all whole and non-fractionated lignocellulosic materials consisting substantially of cellulose, hemicellulose and lignin. Depending on geographic location, different materials are available, for example agricultural residues (e g corn stover, crop straw and bagasse), herbaceous crops (e g alfalfa, switchgrass), softwood and hardwood, short rotation woody crops, preheated and/or torrefied wood, forestry residues (bark as well as branches, roots and tops), and other waste (e g municipal and industrial waste containing whole lignocellulosic biomass like for example waste wood used in the construction industries and/or in packaging of goods). The present inventor has tested sawdust of pine having various dry substance contents, ground roots and branches of spruce, fresh spruce needles, fresh pine bark, and ground municipal waste containing wood, plastic, sand, metal and paint residues.

The terms "unsupported" and "carrier-free" are used to define that the catalyst material, for example the sulfided NiMo catalyst is not deposited on any solid carrier or support material.

The terms "hydrocarbon fraction" and "hydrocarbon phase" relate here to a liquid hydrocarbon fraction recoverable at room temperature following the process disclosed herein, but the definition does not exclude that additional, more volatile hydrocarbons could be condensed at lower temperatures and included in this fraction.

The term "char" refers to solid residue which is separated from the liquid phases after completion of hydrotreatment upgrading reactions as exemplified in the experimental examples below. Sometimes terms as "coke" and "fouling" are used when solid insoluble byproducts possibly formed as a result of thermal degradation side reactions are discussed. For practical purposes, these can be considered as similar concepts.

According to a first aspect, this process for the conversion of lignocellulosic starting materials into an aqueous phase and a hydrocarbon phase is characterized in that a lignocellulosic starting material, either from a single source or from a mixture of relevant starting materials, an amorphous and unsupported sulfided nickel-molybdenum catalyst, and optionally a co-feed, is mixed and subjected to not less than a stoichiometric amount of hydrogen, elevated pressure and a temperature in the interval of 350-450° C., producing an aqueous phase and a hydrocarbon phase.

Preferably said catalyst is introduced into the mixture of lignocellulosic starting materials in the form of a slurry of catalyst particles in a hydrocarbon co-feed. In the alternative, the catalyst and co-feed are added separately.

According to an embodiment of said first aspect, a co-feed is present and said co-feed is chosen from vegetable oils and fats, liquid hydrocarbons, and/or a re-circulated product obtained in said process.

According to another embodiment, freely combinable with the above aspect and embodiments, the lignocellulosic starting material is chosen from wood chips and/or saw dust with a dry content of >50%; forestry residue chosen from bark, and/or roots, and/or branches with a dry content of >50%; wood having been subjected to drying or a torrefaction process; lignocellulose from agriculture like for example straw from crops like oats, wheat, barley and rye, corn stover, grasses and herbs, forage crops, oat husks, rice husks, construction waste containing at least 50% originating from lignocellulosic matter; and mixtures thereof.

Regarding material that has been subjected to drying or a torrefaction process, it is underlined that torrefaction is here considered to be merely a drying step, i.e. the removal of moisture, and not a proper thermochemical process.

According to another embodiment, also freely combinable with the above aspect and embodiments, the lignocellulosic starting material has not been subjected to thermochemical treatment, such as pyrolysis or hydrothermal liquefaction, prior to being subjected to said process.

According to yet another embodiment, also freely combinable with the above aspect and embodiments, the operating pressure is in an interval of 60-300 bar, e.g. 80-300 bar. When the process is operated in a batch-wise fashion, the initial pressure is set according to the available headspace volume and in a way which secures a stoichiometric excess of hydrogen, for instance set at an initial pressure at ambient temperature of 120 bar and allowed to increase and stabilize at 150-300 bar, preferably 250 bar. When the process is operated in a continuous fashion, the pressure is preferably set at 100-200 bar, most preferably 140-180 bar.

A second aspect of the present disclosure relates to a nickel-molybdenum sulfide catalyst, characterized in that said catalyst has the empirical formula with regard to molybdenum (Mo), nickel (Ni) and sulfur (S):

$$Mo_xNi_yS_z$$

wherein $x=1$, $0.1<y<0.2$ and $z<1.0$.

Preferably said catalyst is substantially amorphous as determined by X-ray powder diffraction analysis and optical microscopy using polarized light.

Figure 10:
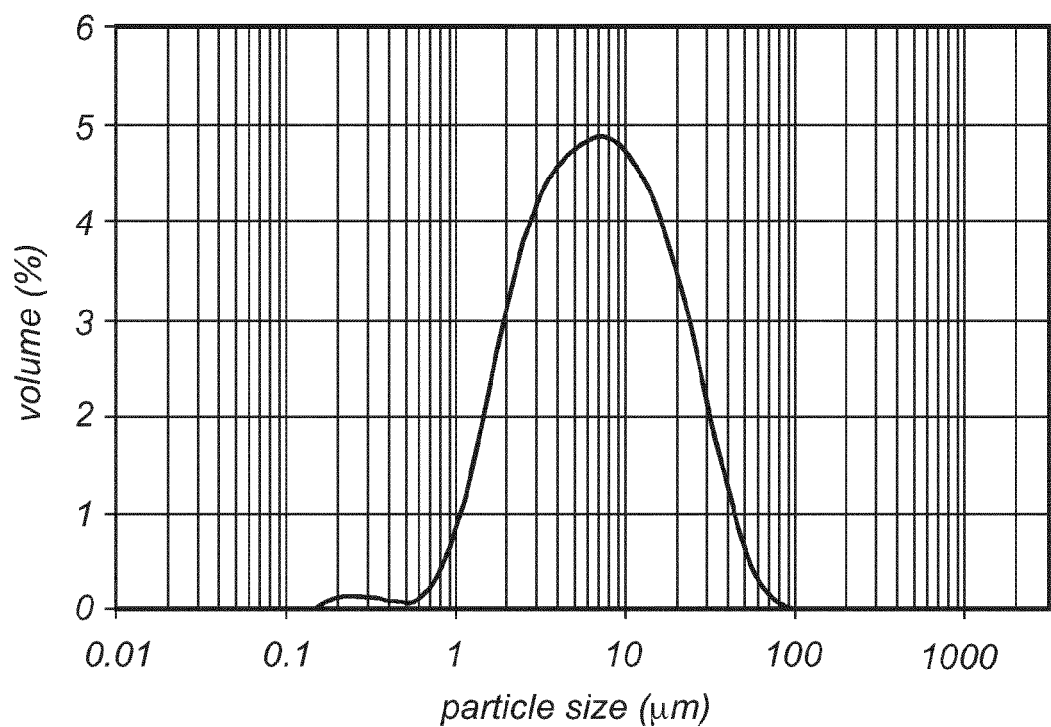
FIG. 10 is a diagram showing the particle size distribution of the catalyst prepared according to Example 1 as measured by laser diffraction.

According to an embodiment of said second aspect, said catalyst has a particle size distribution with a median value of 1-50 μm as determined by laser diffraction. In the example presented herein, an analysis of a sample indicated that the catalyst had a particle size distribution as shown in FIG. 10, where it can be seen that while the particle size ranged from below 1 μm to close to 100 μm, the bulk of the particles had a size in the range of 1.5-30 μm, or even 2-20 μm. It should be kept in mind that a certain degree of agglomeration may be present, and that the X-ray powder diffraction analysis most likely has a lower detection limit at around 0.2 μm crystal size, and also with regard to % volume.

A third aspect of the present disclosure relates to a process for the conversion of lignocellulosic starting materials into an aqueous phase and a hydrocarbon phase, characterized in that a mixture of lignocellulosic starting materials, a catalyst according to the second aspect and embodiments thereof, and optionally a co-feed, is subjected to not less than a stoichiometric amount of hydrogen, elevated pressure and a temperature in the interval of 350-450° C., producing an aqueous phase and a hydrocarbon phase.

A fourth aspect relates to a process of producing a catalyst according to the second aspect and embodiments thereof, comprising the steps of forming a first reaction mixture by mixing $MoO_3$, $(NH_4)_2S$, and water;

pressurizing said first mixture using hydrogen gas, heating and stirring the mixture;

forming a second mixture by adding a hydrocarbon fraction having a kinematic viscosity of less than 2.0 CSt @ 40° C. and $NiSO_4$ (aq.) at a suitable pressure and temperature;

pressurizing said second mixture with hydrogen gas and heating it using a suitable temperature ramp;

depressurizing said second mixture and heating the residual hydrocarbon to a suitable temperature to remove water and part of the hydrocarbon fraction; and recovering the catalyst in the form of a slurry with residual hydrocarbon.

When developing this disclosure, the inventor constructed a lab-scale batch process as described in closer detail in the examples. The batch process made it possible to test different lignocellulosic starting materials, compare the novel catalyst with other already known catalysts, and to test different process parameters. The process was also verified in semi-batch mode.

However, although the process has been tested in a batch and a semi-batch set-up it is equally suitable for continuous operation. An example of a continuous mode process is schematically shown in FIG. 1 where a lignocellulosic starting material (1), one or several optional liquid co-feeds (2) and a catalyst (3) are fed to a mixer (4) in desired proportions. All, or part of the catalyst can be fed into the mixer (4) in the form of a slurry of catalyst and co-feed to facilitate mixing.

The lignocellulosic starting material is optionally subjected to mechanical pretreatment in order to simplify the material handling and to increase the surface to volume ratio. Suitable pretreatment operations include milling, chipping and grinding. In the experiments performed by the inventor so far, starting material of various particle sizes have been tested, for example 0.5-1.5 mm, 1.0-1.4 mm, 2-10 mm, 1-10 mm. The results indicate that the process is capable of handling all these particle sizes, and that the particle size does not appear to be a critical factor.

The mixer (4) is operated to form a heterogeneous mixture of lignocellulosic starting material, catalyst and optionally liquid co-feed/-s, having a relatively even distribution of the different components. A person skilled in the art can choose a suitable equipment for the mixing operation, for example but not limited to stirred tank reactors, for example a stirred vertical reactor, or a stirred horizontal reactor, which rotates or is equipped with rotating impellers. In a semi-continuous process, the mixing can be performed in a separate mixing tank, and the resulting mixture fed into a reaction tank, but in a strictly continuous process, the mixing is performed in a mixing zone leading into a reaction zone, for example a tubular reactor with a screw conveyor for transporting the material.

The mixture is thus fed into a reaction zone (5) and subjected to increased temperature and pressure, for example a temperature in the interval of 350-450° C. and a pressure in the interval of 80-300 bar, preferably about 180 bar. The reaction zone can for example be section of a tubular reactor equipped with a heating mantle. The rate at which the material is transported through the reactor, as well as the temperature and pressure can be adjusted depending on the properties of the starting material and the desired products.

It is currently held that a pressure in the range of 100-200 bar (10-20 MPa) and 370 to 450° C. is most suitable for an efficient hydrodeoxygenation of lignocellulosic raw materials using the present or similar carrier-free catalyst. Without wishing to be bound by any theory, the present inventor contemplates that a higher temperature and longer reaction times results in a more far-reaching hydrogenolysis and hydrogenation of the starting material, whereas lower temperatures and shorter reaction times result in a larger proportion of less hydrogenated aromatic hydrocarbons.

Gaseous components formed during the hydrogenation reaction in reaction zone (5) as well as surplus hydrogen can be collected as indicated in (7). The collected gases can be condensed and used as such or for the synthesis of liquid fuels and/or for the production of hydrogen gas through steam reforming. The collected gases can also be recirculated into the reaction zone or used for heating the reaction zone (not shown in the figure). Following the reaction zone (5), a cooling and separation zone (6) is provided. The feed exiting the reaction zone can be allowed to settle or be separated by centrifugation into a hydrocarbon phase (8) which can be further treated and collected (9); a water phase (10) which can be recirculated or discharged; and a solid phase (11) comprising the catalyst, char formed in the process and possible solid residue (12). The solid phase can be subjected to separation of reusable catalyst from waste products. The catalyst can then be recirculated (3), optionally after washing and/or drying and/or calcination and/or reactivation (11).

A person skilled in the art is well familiar with unit operations such as mixing, transport, gas-liquid, liquid-liquid and liquid-solid separation and the equipment for performing the same, as well as the terminology used to describe and quantify properties used in conjunction with these unit operations such as heat transfer, see for example textbooks such as Unit Operations of Chemical Engineering, Warren L. McCabe et al., 7th Ed., McGraw-Hill Professional, 2004.

The present disclosure provides a process which entirely avoids a separate thermochemical conversion step to an intermediate bio-oil or biocrude, instead converting the lignocellulosic feedstock directly to hydrocarbons in an overall more simple and robust process.

Considering the complex situation with regard to catalyst design and optimization briefly described in the background section, the present inventor considers that observed performance of the catalyst disclosed herein, is surprisingly positive and unprecedented, this particular catalyst being able to convert whole biomass with varying particle sizes and up to high water content, either alone or co-fed with different liquid feedstocks, directly in a single step to hydrocarbon mixtures well separated from water with inorganics present in the starting feed dissolved in the separated aqueous phase.

EXAMPLES

Estimation of Theoretical and Actual Yields and Estimation of Hydrogen Consumption Below is outlined the general procedure upon which the chemical yield is calculated. The biomass discussed herein is considered to be composed of lignin, cellulose, hemicellulose and water. It should be apparent to a person familiar to the field that the listed hydrocarbon products are not considered to be representative of any actual distribution within a final reaction mixture but are given as example products only.

For simplicity and to apply a general approach to the characterization of all experiments herein the hemicellulose and cellulose fractions are assumed to consist of cellulose only. The lignin polymer component is considered to be in its native unmodified state and is here described by the repeating unit structure shown in FIG. 18. The ratio between lignin and the combined hemicellulose and cellulose fraction is assumed to be 30:70 by mass for all biomass feeds discussed herein, whereas the water content has been analyzed separately for all types of biomass.

In the tables below are listed the molecular composition of the starting materials and their products:

TABLE 1

Calculation basis for the lignin component

| Role | Component | Molecular formula | Molecular weight (g/mol) | Multiplicity per repeating unit | C | H | O |
|---|---|---|---|---|---|---|---|
| Starting material | Lignin | $C_{278}H_{310}O_{95}$ | 5171.45 | 1 | 278 | 310 | 95 |
| Products | Phenylpropane | $C_9H_{18}$ | 126.2412 | 28 | 252 | 504 | |
| | Methane | $CH_4$ | 16.0426 | 26 | 26 | 104 | |
| | Water | $H_2O$ | 18.0152 | 95 | | 190 | 95 |
| Atom deficiency | | | | | 0 | −488 | 0 |

TABLE 2

Calculation basis for the hemicellulose/cellulose component

| Role | Component | Molecular formula | Molecular weight (g/mol) | Multiplicity per repeating unit | C | H | O |
|---|---|---|---|---|---|---|---|
| Starting material | Cellulose (repeating unit) | $C_6H_{10}O_6$ | 162.142 | 1 | 6 | 10 | 5 |
| Products | Hexane | $C_6H_{14}$ | 86.1766 | 1 | 6 | 14 | |
| | Water | $H_2O$ | 18.0152 | 5 | | 10 | 5 |
| Atom deficiency | | | | | 0 | −14 | 0 |

TABLE 3

Calculation basis for the rapeseed oil component

| Role | Component | Molecular formula | Molecular weight (g/mol) | Multiplicity per repeating unit | C | H | O |
|---|---|---|---|---|---|---|---|
| Starting material | Rapeseed oil | $C_{57}H_{104}O_6$ | 885.45 | 1 | 57 | 104 | 6 |
| Products | Octadecane | $C_{18}H_{38}$ | 254.4982 | 3 | 54 | 114 | |
| | Propane | $C_3H_8$ | 44.0962 | 1 | 3 | 8 | |
| | Water | $H_2O$ | 18.0152 | 6 | | 12 | 6 |
| Atom deficiency | | | | | 0 | −30 | 0 |

The diesel component is assumed to be a component which does not consume any hydrogen gas in the reactions herein and is treated as merely an inert bulk component. Also, any water in the starting biomass feed (present as moisture) is assumed to pass unaffected through the process.

In the table below the theoretical mass balances are given for each component:

TABLE 4

Summary table of mass balances

| Starting material | Products | From 1 g of starting material (mg) | $H_2$ demand for 1 g of starting material (mg) |
|---|---|---|---|
| Lignin | Phenylpropane | 683 | 95 |
| | Methane | 81 | |
| | Water | 341 | |
| Cellulose | Hexane | 531 | 87 |
| | Water | 556 | |
| Rapeseed oil | Octadecane | 862 | 34 |
| | Propane | 50 | |
| | Water | 122 | |

Estimation of Actual Hydrogen Consumption

The total reactor volume in the used reactor (Büchi limbo 3, 100 mL—refer to the General Experimental Procedure) was estimated to be 120 mL. To estimate the amount of added gas to the reactor the solid and liquid components present in the reactor were estimated to occupy a volume of 1 mL/g. Hence, the headspace in the reactor was approximated to be 120 minus the mass of solid+liquid reactants (in mL).

For a reactor containing 30 g of solid+liquid reagents the remaining headspace would, hence, be approximated to 90 mL. If a hydrogen pressure of 100 bar were to be applied onto this reactor and assuming that the molar volume of gas is 22.4 L/mol at room temperature the corresponding amount of hydrogen would be approximated to 100*90/22400=402 mmol.

In order to determine the amount of consumed hydrogen gas during a hydrodeoxygenation reaction the pressure difference before and after a cooled reaction was recorded applying the assumption that reactants and products occupy the same volume. It is important to realize that any gaseous hydrocarbon products, such as methane and propane, would add to the final pressure in the reactor, and even though the solubility of these gases would be quite high in the hydrocarbon products at room temperature it leads to the fact that the obtained numbers for hydrogen consumption are conservative.

Calculation Example: Theoretical Mass Yield of Liquid and Gaseous Products and Hydrogen Requirement for an Experiment Based on the data from Tables 1 to 4 above, the theoretical mass yield calculation and hydrogen requirement for Example 13 are given below.

TABLE 5

Theoretical mass yield calculation and hydrogen requirement for Example 13

| Component | Total mass (g) | Sub-components | Mass (g) | Hydrocarbons **, mass (g) | Water, mass (g) | Required $H_2$ (mg) |
|---|---|---|---|---|---|---|
| Sawdust * | 3.76 | Lignin | 1.01 | 0.772 | 0.334 | 95 |
| | | Cellulose | 2.36 | 1.254 | 1.311 | 205 |
| | | Water | 0.39 | 0 | 0.39 | 0 |
| Rapeseed oil | | | 5.65 | 5.153 | 0.690 | 193 |
| Diesel fuel | | | 5.66 | 5.66 | 0 | 0 |
| Catalyst slurry | 0.69 | Catalyst | 0.28 | 0 | 0 | 0 |
| | | Dodecane | 0.41 | 0.41 | 0 | 0 |
| Theoretical total yields | | | | 13.25 | 2.37 | 494 |

* Dry substance 89.7% of which the dry material is assumed to have lignin:cellulose ratio of 30:70.
** Octadecane, phenylpropane, dodecane, hexane, propane and/or methane as applicable (refer to summary table)

For the actual experiment the isolated liquid hydrocarbon phase was 11.657 g which corresponds to 88% (11.657/13.25) of the theoretical yield. No gaseous products were isolated during the experiments. In the experiment above the theoretical amount of gaseous hydrocarbon products (methane and propane) was 0.36 g.

Experimental Set-Up

The chemical experiments outlined in this work, except for three, were performed in 100 mL reactors from Büchi AG, Switzerland (model limbo3), rated at a jacket temperature of 500° C. and a working pressure of 350 bars. The reactors, together with their pressure logging capabilities, were operated by the software LabGear™, owned and managed by RISE AB, Sweden.

Figure 15:
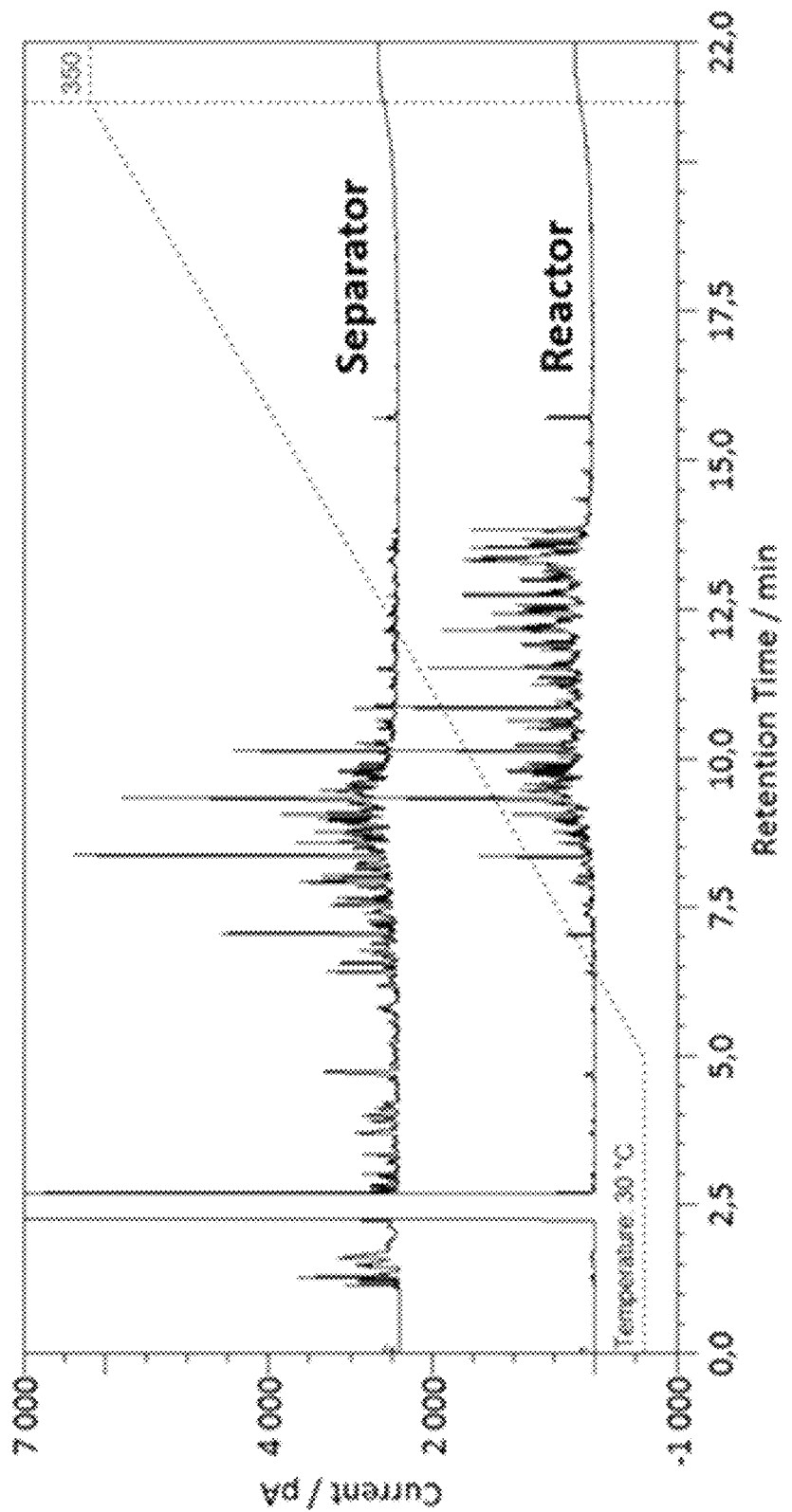
FIG. 15 shows a gas chromatography (GC) analysis of products derived from Example 27 which were isolated from the HP-HT-Separator, and from the reactor, depicted in FIG. 14.
Figure 16:
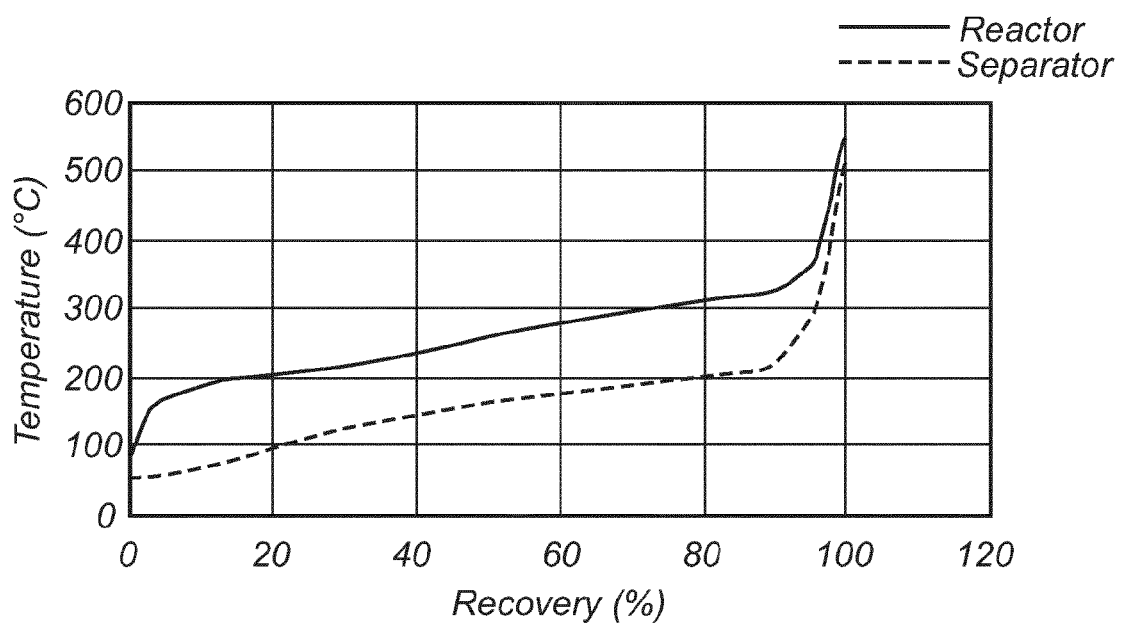
FIG. 16 shows a GC-SIMDIST analysis of products derived from Example 27 which were isolated from the HP-HT-Separator, and from the reactor, depicted in FIG. 14.

The three other chemical experiments were performed using:
- A 1.8 L stainless steel pressure reactor used in the Mettler-Toledo Role system to produce the slurry catalyst described in Example 1.
- A 500 mL high-pressure/high-temperature reactor by Parr used in Example 25 to convert pine saw dust to hydrocarbon and water products.
- The slurry hydrocracker setup described in Example 27 and FIG. 15 to convert torrefied saw dust and co-feed into hydrocarbon product on a 2 L-scale.

During a typical experiment the reactor would be charged with the desired solid and liquid reactants and sealed using the outlined procedure from the manufacturer. The reactor contents were put under an inert atmosphere using three cycles of pressurization/de-pressurization using nitrogen gas at six bars followed by pressurization using hydrogen gas to the desired starting pressure, typically 100-120 bars unless otherwise stated.

To the reactor was applied stirring using an impeller at 800 rpm and the reactor temperature was raised to the desired reaction temperature and was allowed to soak there for a chosen reaction time. When the reaction time had been reached the heat was shut off and the reactor was allowed to cool, typically overnight, to room temperature. During the whole reaction sequence the jacket and reactor temperatures as well as the reactor pressure were logged using LabGear™.

After cooling to room temperature, the reactor was depressurized and applied an inert atmosphere using pressurization/de-pressurization of $N_2$ gas in three cycles. The contents were handled as follows:

Step 1: The reactor was opened, and the reactor contents transferred, to an as extensive degree as possible, to a centrifuge vial. The vial was centrifuged at 2880×G for 20 minutes. After this the upper organic phase was transferred to a "product vial" and the aqueous phase was transferred to a corresponding "water phase".

Step 2: The reactor and reactor lid were washed in two cycles using n-pentane which was added to the initial solid phase, vortexed or manually shaken, followed by centrifugation at the above stated conditions, and transferred to a round-bottomed flask which was concentrated in vacuo and dried under vacuum overnight to give a pentane soluble fraction.

Step 3: The procedure above was repeated using tetrahydrofuran (THF), which yielded a concentrated THF soluble fraction.

Step 4: The solids obtained after the four wash cycles above were dried at 40° C. under vacuum overnight to yield a dry solid fraction which was gravimetrically determined. The characterization of the main hydrocarbon product, such as TGA and NMR, was always performed on the product collected when first opening the reactor in Step 1. The gravimetric analysis of the product was performed on the combined products from Step 1-3 above, which is assumed to give a conservative value considering any volatile products formed.

Manufacturing of Catalyst and Torrefied Wood

Manufacturing of catalyst and preparation of torrefied wood were performed in a reaction calorimeter RC1e (Mid-Temp) from Mettler-Toledo LLC, USA, using a 1.8 L stainless steel reactor rated at 60 bars and 250° C.

Analyses

Determination of hydroxyl numbers analyzing amounts of hydroxyl groups belonging to aliphatic alcohols (aliphatic OH), phenols (aromatic OH) and OH-groups of carboxylic acids, was performed by $^{31}$P-NMR on a Bruker Avance 500 UltraShield NMR spectrometer using methodology described for instance in L. Akim et al. Holzforschung 2001, 55, 386-390. $^1$H-NMR was used to characterize relative amounts of protons being part of aromatic, aliphatic, ether/alcohol, aldehyde, ketone, carboxylic acid and olefin functionalities of the obtained product mixtures.

Boiling point ranges were determined using thermogravimetric analysis on a Mettler-Toledo TGA/SDTA851e instrument. An alternative method used for Example 27 is simulated distillation gas chromatography (GC-SIMDIST), used according to ASTM 7169 and ASTM 2887 to determine the boiling point distributions of heavier and light hydrocarbon products, respectively.

Particle size distribution was performed using a Malvern Mastersizer 2000 laser diffractor.

X-ray powder diffraction analysis (XRPD) was performed on a PANalytical X'Pert PRO spectrometer.

Gas chromatography/mass spectroscopy (GCMS) was performed on an Agilent 6890N gas chromatograph with an Agilent 5973 mass spectrometer using a Rxi-% Sil MS column (30 m×0.25 mm, film thickness 0.25 µm).

Optical microscopy was performed on an Olympus BX51 microscope.

Trace element analysis and halogen content analysis were performed by an external analysis laboratory, ALS Scandinavia, Sweden.

Total Organic Carbon (TOC) was performed by MoRe Research Örnsköldsvik AB, Örnsköldsvik, Sweden.

Elemental analysis was used to determine content of carbon, hydrogen, nitrogen and sulfur. The elemental analysis was performed by Uniper Karlshamnsverkets Laboratorium, Karlshamn, Sweden. The oxygen content was calculated by difference.

Depending on which product samples, other analyses which are not shown here have been performed.

Raw Materials

Wood characterization: The starting material were used as received and characterized with regard to water content.

Rapeseed oil characterization: Rapeseed oil is a source of triglycerides and is assumed to contain negligible amounts of free hydroxyl groups, typically consisting of triglycerides in the range of 96-100%.

Diesel: Samples of commercial diesel fuel from a gas station (Circle K) were used.

Example 1. Preparation of a NiMo Slurry Catalyst

TABLE 6

Reagents

Molybdenum trioxide ($MoO_3$), 99% (CAS No. 1313-27-5, AK Scientific Inc., Product No. X4168)
Ammonium sulfide solution, 20 weight % in water (CAS No. 12135-76-1, sold by Sigma-Aldrich/Merck KGaA, product No. W205303)
Nickel(II) sulfate hexa/hepta hydrate (CAS No. 15244-37-8, sold by Sigma-Aldrich/Merck KGaA, product No. 13635)
n-Dodecane, 99% purity (CAS No. 112-40-3, supplier e.g. Alfa Aesar/Thermo Fisher Scientific)
Water (ultra-pure (type I))

Figure 2:
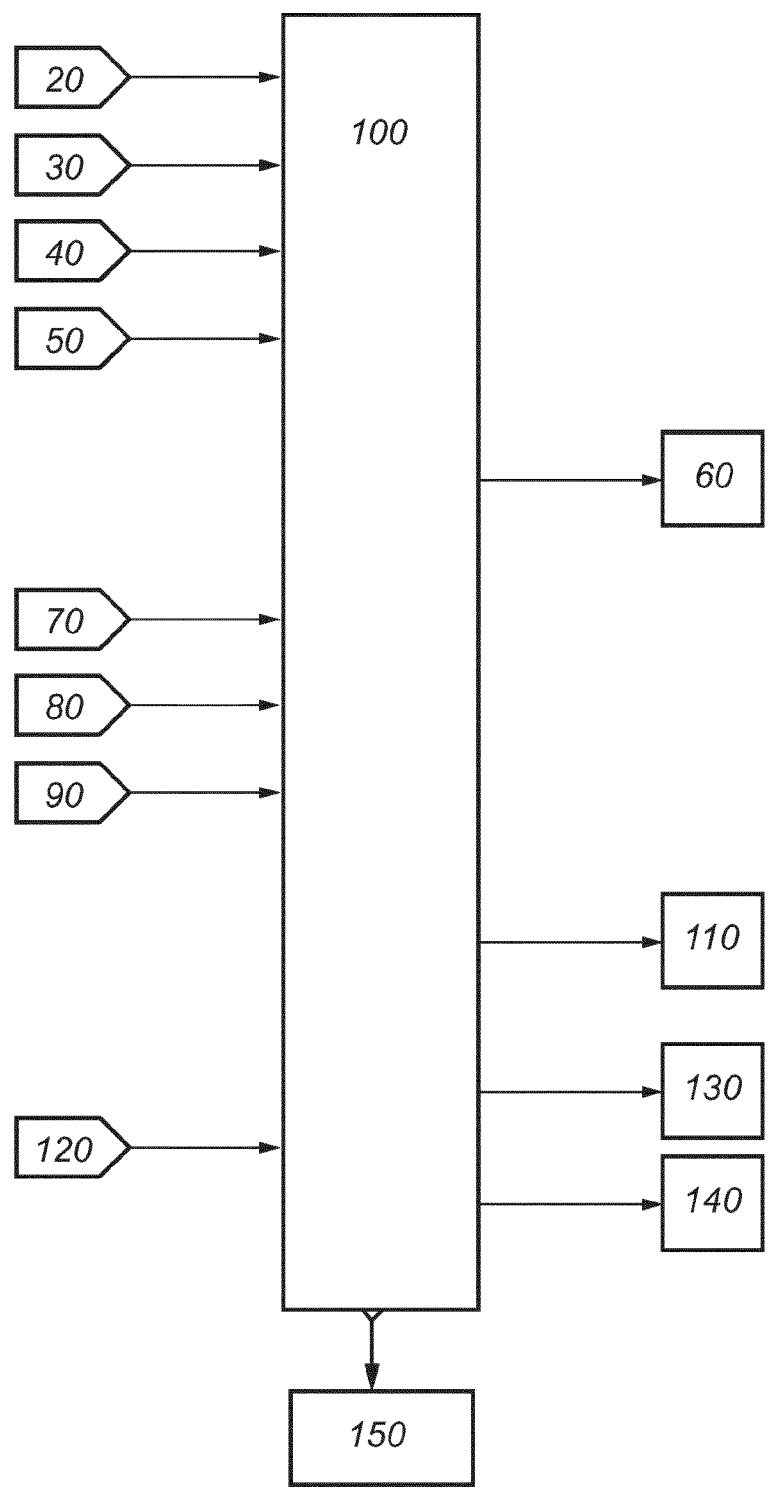

A low-sulfided nickel-molybdenum catalyst was produced as schematically shown in FIG. 2, adhering to the following steps:

To a 1.8 L pressure proof stainless steel vessel (100) was added 40 g of molybdenum trioxide (20), 68.4 g of a 20% (w/w) aqueous solution of ammonium sulfide (30) and 121.9 g of ultra-pure water (40). After flushing with nitrogen gas, the reactor was pressurized to 26 bar using hydrogen gas (50). The reactor had been equipped with a blade impeller which was set to a tip speed of 4-5 m/s and the reactor temperature was adjusted to 64-68° C. and held at this temperature for 4 hours. After cooling to 40° C. and de-pressurization the headspace to atmospheric pressure (60) 593 g of dodecane (70) was added followed by 38.1 g of a 36.2% (w/w) nickel(II)sulfate hexa/heptahydrate solution (80). The latter was added during 30 min via a syringe pump at the maintained stirrer speed. The reactor was pressurized to 18 bar using hydrogen gas (90) and was heated to 210° C. for 6 hours and then allowed to remain at this temperature for an additional hour.

The reactor was cooled to 40° C. for 2 hours when the headspace was released (110) and the reactor was equipped with a water-cooled distillation head. To the reactor was applied a stream of nitrogen gas ballast (120) at approximately 2 L/min and the reactor temperature was ramped up at approx. 2 K/min. The procedure was continued until the water fraction (130) followed by approximately 50% of the dodecane fraction (140) had been distilled off. After cooling to room temperature, the reactor content, consisting of an activated nickel-molybdenum slurry catalyst in dodecane, was poured into a glass beaker (150) and stored awaiting use. In one preparation procedure the solid content of the slurry was found to be 40.2% (w/w).

The empirical molecular formula according to the procedure above was $MoNi_{0.163}S_{0.722}$ with correction for assay and purities for the reagents. See Example 18 for elemental analysis.

Example 2. Hydrodeoxygenation of Pine Saw Dust

The catalyst produced as in Example 1 was used to hydrodeoxygenate several different starting materials using an experimental set-up as described above. In this example, pine saw dust (3.77 g), rape-seed oil (6.01 g), diesel (5.26 g) and a catalyst prepared as described in Example 1 (614 mg) were mixed at room temperature. The inerted reactor was pressurized with hydrogen (115 bar). The reaction mixture was heated to 420° C. and held at that temperature for 120 min. The maximum working pressure during the reaction was 245 bars.

Figure 3:
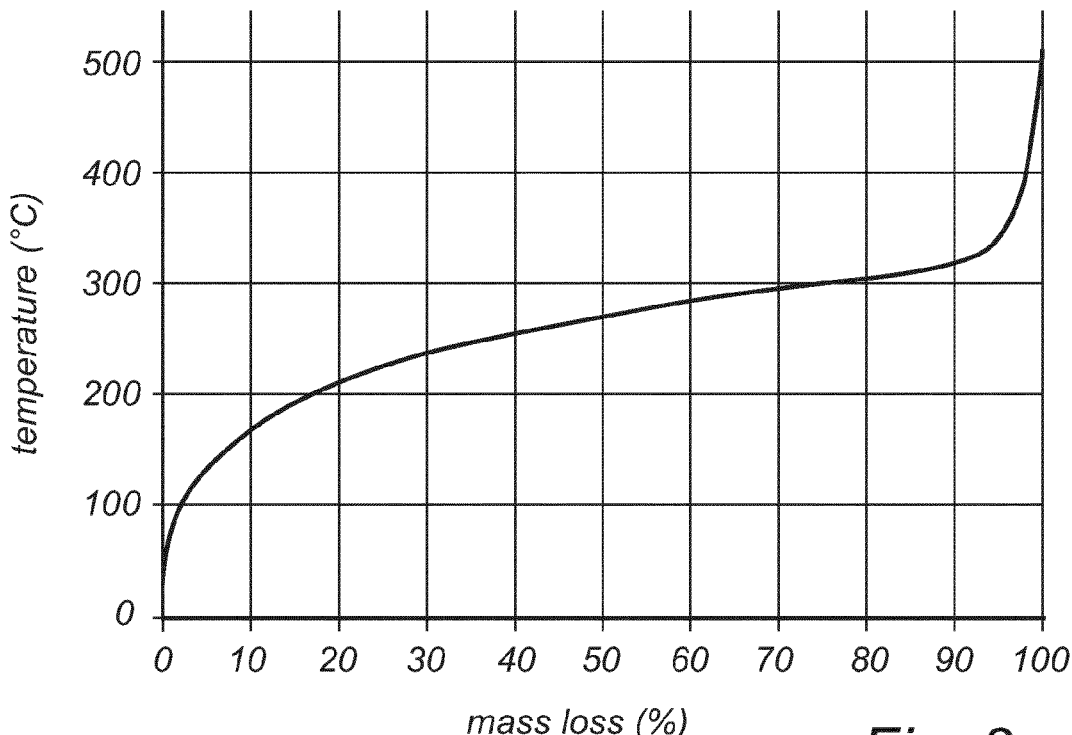
FIG. 3 is a graph showing the results of a thermogravimetric analysis (TGA) of the product of Example 2, i.e. a TGA curve showing the composition of the hydrocarbon phase over a boiling point range of 0 to 500° C.

Following the procedures outlined under "Experimental set-up" resulted in 11.3 g of a dark amber liquid (86% yield). NMR-data for the product is found below (Tables 7 and 8) and the TGA-curve in FIG. 3.

The amount of deposited coke as calculated on the whole feed was 0.06%.

Elemental analysis yielded the following results: C, 83.6%, H, 14.1%, N 0.1%, S, 0.05%, O, 2.15% (by difference). Based on these values the calculated H/C-ratio is 2.01.

TABLE 7

$^1$H-NMR (CDCl$_3$) results for Example 2 (normalized integrals)

| Example 2: $^1$H-NMR signals | ppm | Integral |
|---|---|---|
| Carboxylic acid H (COOH) and aldehyde H (CHO) | 12-9 | 0 |
| Aromatic H | 9-6.2 | 0.92 |
| Olefin H | 6.2-4.5 | 0.31 |
| Aliphatic alcohol H, -CHOH or aliphatic ether -CHOR | 4.5-3.3 | 0.02 |
| Aliphatic H | 3.3-0 | 98.7 |

TABLE 8

Hydroxyl numbers for Example 2

| | Aliphatic OH (mmol/g) | Aromatic OH (mmol/g) | Carboxylic acid |
|---|---|---|---|
| Example 2 | 0.039 | 0.11 | 0.00 |

Example 3. Hydrodeoxygenation of Pine Saw Dust

In this example, sieved pine saw dust (1.0-1.4 mm, 3.79 g), diesel (11.25 g) and a catalyst prepared as described in Example 1 (614 mg) were mixed at room temperature. The inerted reactor was pressurized with hydrogen (123 bar). The reaction mixture was heated to 420° C. and held at that temperature for 120 min under which the maximum operating temperature was 265 bars.

Figure 4:
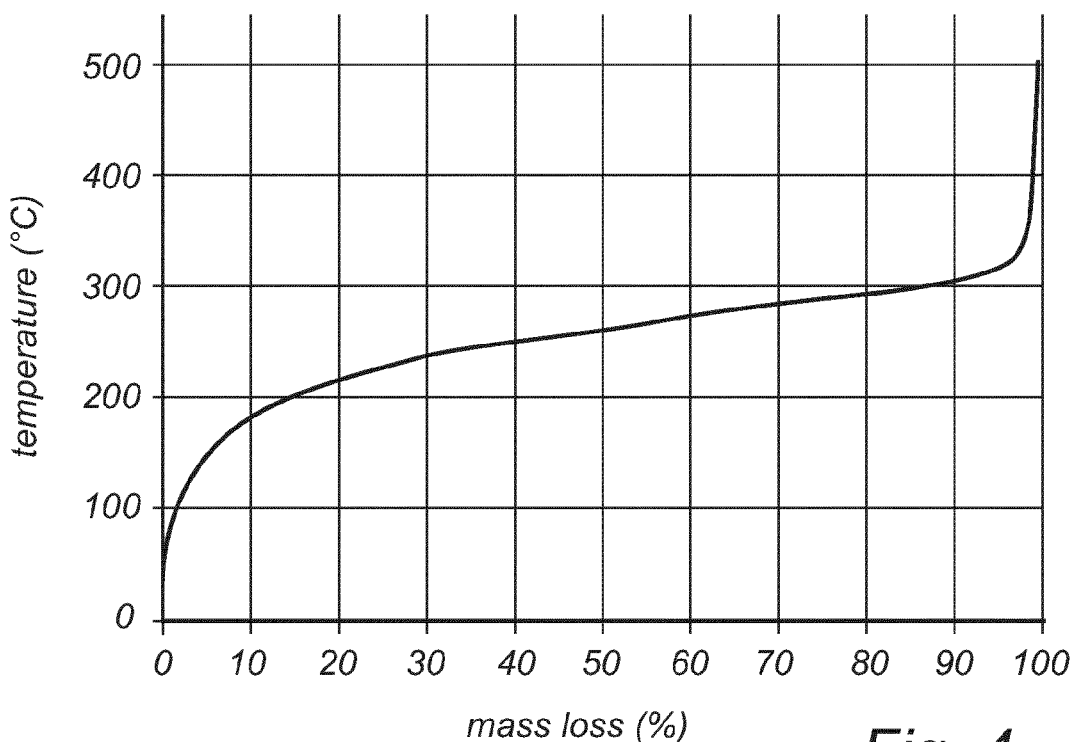
FIG. 4 shows the TGA curve for the product of Example 3.

Following the procedures outlined under "Experimental set-up" the experiment resulted in 11.9 g of a bright yellow liquid (87% yield). NMR-data for the product is found below (Tables 9 and 10) and the TGA-curve is shown in FIG. 4.

The amount of deposited coke as calculated on the whole feed was 0.32%.

Elemental analysis: C, 86.4%, H, 14.7%, N, 0.1%, S, 0.05%, O, −1.25% (by difference). From these values the calculated H/C-ratio is 2.03.

TABLE 9

$^1$H-NMR (CDCl$_3$) results for Example 3 (normalized integrals)

| Example 3: $^1$H-NMR signals | ppm | Integral |
|---|---|---|
| Carboxylic acid H (COOH) and aldehyde H (CHO) | 12-9 | 0 |
| Aromatic H | 9-6.2 | 0.81 |
| Olefin H | 6.2-4.5 | 0.00 |
| Aliphatic alcohol H, —CHOH or aliphatic ether —CHOR | 4.5-3.3 | 0.00 |
| Aliphatic H | 3.3-0 | 99.3 |

TABLE 10

Hydroxyl numbers for Example 3

| | Aliphatic OH (mmol/g) | Aromatic OH (mmol/g) | Carboxylic acid |
|---|---|---|---|
| Example 3 | 0.00 | 0.00 | 0.00 |

Example 4. Hydrodeoxygenation of Pine Saw Dust

Sieved pine saw dust (particle size 1.0-1.4 mm, 3.61 g) and a catalyst prepared as described in Example 1 (328 mg) were mixed at room temperature. Rapeseed oil (5.75 g) and diesel fuel (5.20 g) were added and the reactor was sealed. The inerted reactor was pressurized with hydrogen (120 bar). The reaction mixture was heated to 400° C. and held at that temperature for 120 min. The maximum working pressure was 230 bars.

Figure 5:
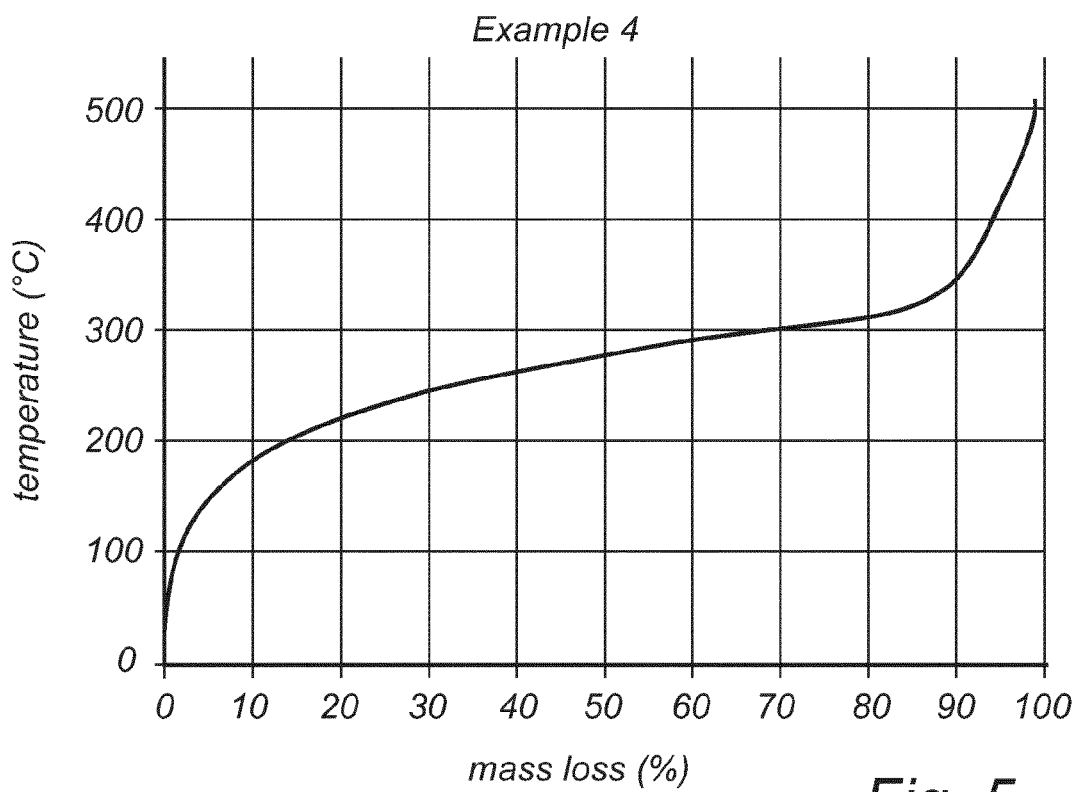
FIG. 5 shows the TGA curve for the product of Example 4.

Following work-up procedures described under "Experimental set-up" 10.95 g of a dark amber liquid (87% yield) could be isolated. NMR-data for the product is presented in Tables 11 and 12 and the TGA curve is shown in FIG. 5.

The amount of deposited coke as calculated on the whole feed was 0.40%.

Elemental analysis: C, 85.5%, H, 14.3%, N, 0.1%, S, 0.05%, O, 0.05% (by difference). From these values the calculated H/C-ratio is 1.99.

TABLE 11

$^1$H-NMR (CDCl3) results for Example 4 (normalized integrals)

| Example 4: $^1$H-NMR signals | ppm | Integral |
|---|---|---|
| Carboxylic acid H (COOH) and aldehyde H (CHO) | 12-9 | 0 |
| Aromatic H | 9-6.2 | 0.93 |
| Olefin H | 6.2-4.5 | 0.42 |
| Aliphatic alcohol H, —CHOH or aliphatic ether —CHOR | 4.5-3.3 | 0.00 |
| Aliphatic H | 3.3-0 | 98.7 |

TABLE 12

Hydroxyl numbers for Example 4

| | Aliphatic OH (mmol/g) | Aromatic OH (mmol/g) | Carboxylic acid |
|---|---|---|---|
| Example 4 | 0.13 | 0.21 | 0.00 |

Example 5. Hydrodeoxygenation of Pine Saw Dust

Pine saw dust (particle size 1.0-1.4 mm, 9.99 g) and a catalyst prepared as described in Example 1 (1505 mg) were mixed at room temperature. The inerted reactor was pressurized with hydrogen (121 bar). The reaction mixture was heated to 420° C. and held at that temperature for 13 min. Maximum working pressure was 273 bars.

Following the procedures outlined under "Experimental set-up" 3.79 g (63% yield) of a dark brown organic phase liquid together with 4.78 g (85% yield) of a colorless aqueous phase could be isolated. NMR-data for the product is presented in Tables 13 and 14.

The amount of deposited coke as calculated on the whole feed was 0.54%.

Elemental analysis: C, 81%, H, 11.3%, N, 0.3%, S, 0.05%, O, 7.35% (by difference). From these values the calculated H/C-ratio is 1.66.

TABLE 13

$^1$H-NMR (CDCl3) results for Example 5 (normalized integrals)

| Example 5: $^1$H-NMR signals | ppm | Integral |
|---|---|---|
| Carboxylic acid H (COOH) and aldehyde H (CHO) | 12-9 | 0 |
| Aromatic H | 9-6.2 | 7.00 |
| Olefin H | 6.2-4.5 | 0.61 |
| Aliphatic alcohol H, —CHOH or aliphatic ether —CHOR | 4.5-3.3 | 0.50 |
| Aliphatic H | 3.3-0 | 91.9 |

TABLE 14

Hydroxyl numbers for Example 5

| | Aliphatic OH (mmol/g) | Aromatic OH (mmol/g) | Carboxylic acid |
|---|---|---|---|
| Example 5 | 0.14 | 0.22 | 0.00 |

Example 6. Hydrodeoxygenation of Pine Saw Dust

Pine saw dust (10.58 g) and a catalyst prepared as described in Example 1 (1031 mg) were mixed at room temperature. The inerted reactor was pressurized with hydrogen (123 bar). The reaction mixture was heated to 420° C. and held at that temperature for 120 min during which the maximum working pressure reached 270 bars.

Following the procedures outlined under "Experimental set-up" resulted in 3.74 g of a dark brown organic liquid (62% yield) together with 4.28 g (71% yield) of an aqueous phase. NMR-data for the organic product is shown below (Tables 15 and 16).

The amount of deposited coke as calculated on the whole feed was 0.32%.

Elemental analysis: C, 85.3%, H, 12.2%, N, 0.1%, S, 0.05%, O, 2.35% (by difference). From these values the calculated H/C-ratio is 1.70.

TABLE 15

$^1$H-NMR (CDCl3) results for Example 6 (normalized integrals)

| Example 6: $^1$H-NMR signals | ppm | Integral |
|---|---|---|
| Carboxylic acid H (COOH) and aldehyde H (CHO) | 12-9 | 0 |
| Aromatic H | 9-6.2 | 7.10 |
| Olefin H | 6.2-4.5 | 0.42 |
| Aliphatic alcohol H, —CHOH or aliphatic ether —CHOR | 4.5-3.3 | 0.26 |
| Aliphatic H | 3.3-0 | 92.22 |

TABLE 16

Hydroxyl numbers for Example 6

| | Aliphatic OH (mmol/g) | Aromatic OH (mmol/g) | Carboxylic acid |
|---|---|---|---|
| Example 6 | 0.089 | 0.90 | 0.007 |

Example 7. Hydrodeoxygenation of Pine Saw Dust

Pine saw dust (7.60 g), diesel (22.25 g) and molybdenum (III)-2-ethylhexanoate (2642 mg) were mixed at room temperature. The inerted reactor was pressurized with hydrogen (120 bar). The reaction mixture was heated to 420° C. and held at that temperature for 120 min. The maximum working pressure was 257 bars.

Figure 6:
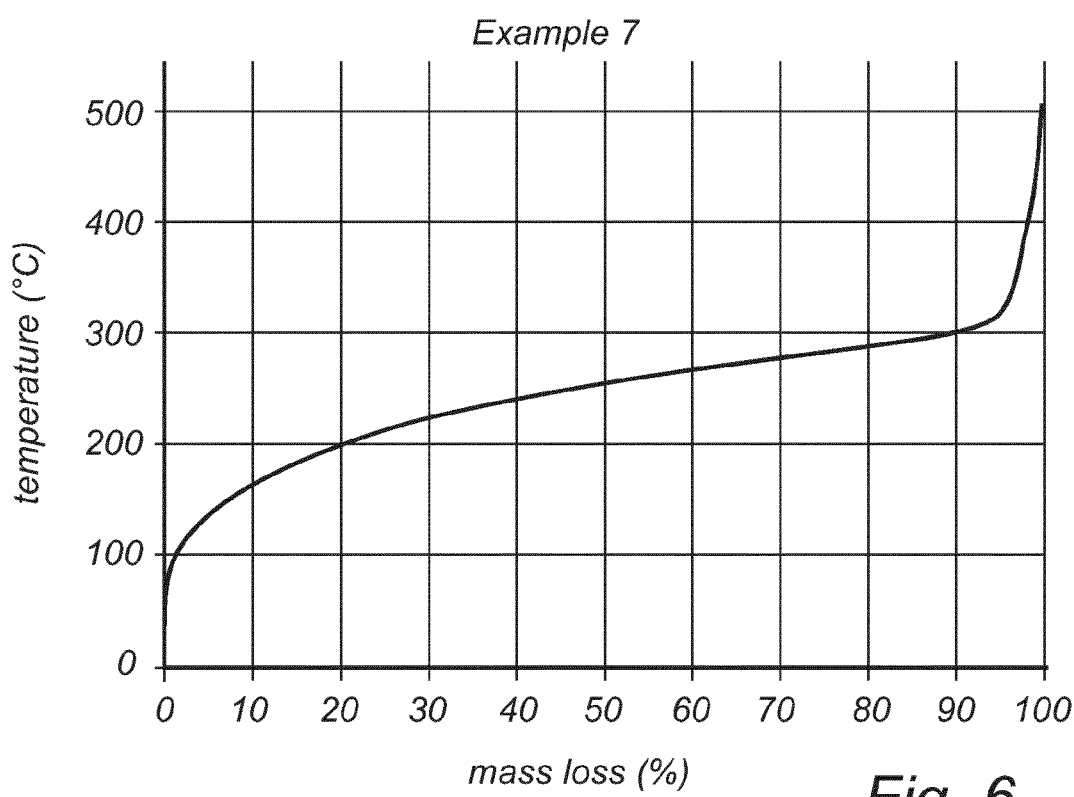
FIG. 6 shows the TGA curve for the product of Example 7.

Reaction work-up was performed as outlined under "Experimental set-up" giving 24.6 g of an amber organic liquid (87% yield) and 1.40 g (32% yield) of an aqueous phase. NMR-data for the product is given in Tables 17 and 18 and the TGA results in FIG. 6.

The amount of deposited coke as calculated on the whole feed was 0.93%.

TABLE 17

¹H-NMR (CDCl₃) results for Example 7 (normalized integrals)

| Example 7: ¹H-NMR signals | ppm | Integral |
|---|---|---|
| Carboxylic acid H (COOH) and aldehyde H (CHO) | 12-9 | 0 |
| Aromatic H | 9-6.2 | 1.20 |
| Olefin H | 6.2-4.5 | 0 |
| Aliphatic alcohol H, —CHOH or aliphatic ether —CHOR | 4.5-3.3 | 0 |
| Aliphatic H | 3.3-0 | 98.8 |

TABLE 18

Hydroxyl numbers for Example 7

| | Aliphatic OH (mmol/g) | Aromatic OH (mmol/g) | Carboxylic acid |
|---|---|---|---|
| Example 7 | 0.025 | 0.038 | 0.00 |

Example 8. Hydrodeoxygenation Fresh Spruce Branch

Saw dust from fresh spruce branch (particle size 0.5-1.5 mm, 4.54 g), rape-seed oil (5.28 g), diesel (5.30 g) a catalyst prepared as described in Example 1 (700 mg) were mixed at room temperature. The inerted reactor was pressurized with hydrogen (121 bar). The reaction mixture was heated to 400° C. and held at that temperature for 120 min where the maximum working pressure reached 281 bars.

After work-up procedures described under "Experimental set-up" 10.7 g of an amber liquid (89% yield) was obtained. NMR-data for the product is presented in Tables 19 and 20.

The amount of deposited coke as calculated on the whole feed was 0.57%.

TABLE 19

¹H-NMR (CDCl3) results for Example 8 (normalized integrals)

| Example 8: ¹H-NMR signals | ppm | Integral |
|---|---|---|
| Carboxylic acid H (COOH) and aldehyde H (CHO) | 12-9 | 0 |
| Aromatic H | 9-6.2 | 0.91 |
| Olefin H | 6.2-4.5 | 0.46 |
| Aliphatic alcohol H, —CHOH or aliphatic ether —CHOR | 4.5-3.3 | 0.16 |
| Aliphatic H | 3.3-0 | 98.46 |

TABLE 20

Hydroxyl numbers for Example 8

| | Aliphatic OH (mmol/g) | Aromatic OH (mmol/g) | Carboxylic acid |
|---|---|---|---|
| Example 8 | 0.162 | 0.235 | 0.020 |

Example 9. Hydrodeoxygenation of Fresh Spruce Root

Saw dust from fresh spruce root (particle size 0.5-1.5 mm, 3.77 g), rape-seed oil (5.67 g), diesel (5.81 g) a catalyst prepared as described in Example 1 (658 mg) were mixed at room temperature. The inerted reactor was pressurized with hydrogen (121 bar). The reaction mixture was heated to 400° C. and held at that temperature for 120 min. The working pressure reached 237 bars.

Figure 7:
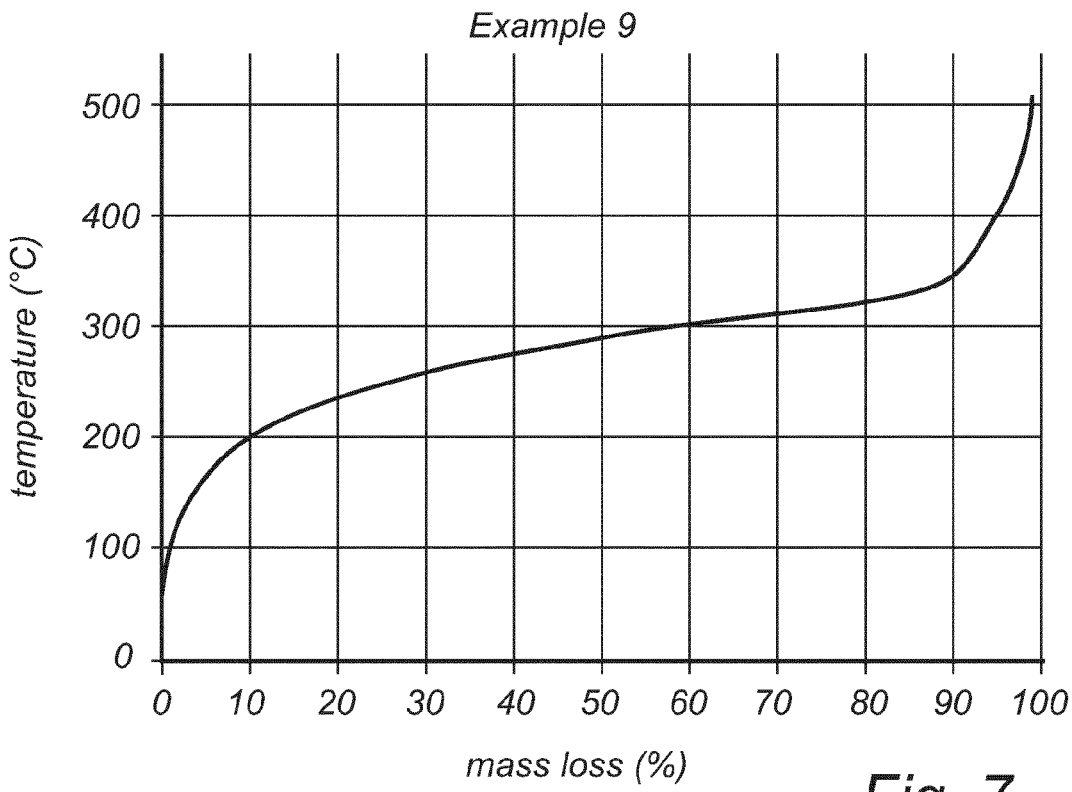
FIG. 7 shows the TGA curve for the product of Example 9.

Reaction work-up was performed as outlined under "Experimental set-up" resulted in 11.2 g of a light amber liquid (86% yield). NMR-data for the product is presented in Tables 21 and 22 and the TGA curve shown in FIG. 7.

The amount of deposited coke as calculated on the whole feed was 0.46%.

Elemental analysis: C, 85.9%, H, 14.5%, N, 0.1%, S, 0.05%, O –0.55% (by difference). Based on these values the calculated H/C-ratio is 2.01.

TABLE 21

¹H-NMR (CDCl₃) results for Example 9 (normalized integrals)

| Example 9: ¹H-NMR signals | ppm | Integral |
|---|---|---|
| Carboxylic acid H (COOH) and aldehyde H (CHO) | 12-9 | 0 |
| Aromatic H | 9-6.2 | 0.84 |
| Olefin H | 6.2-4.5 | 0.37 |
| Aliphatic alcohol H, —CHOH or aliphatic ether —CHOR | 4.5-3.3 | 0.03 |
| Aliphatic H | 3.3-0 | 98.8 |

TABLE 22

Hydroxyl numbers for Example 9

| | Aliphatic OH (mmol/g) | Aromatic OH (mmol/g) | Carboxylic acid |
|---|---|---|---|
| Example 9 | 0.087 | 0.12 | 0.00 |

Samples of the organic product of examples 2, 3, 4, and 9 were sent for elemental analysis. The results show a hydrogen-to-carbon ratio of 2.01±0.02. These experiments were performed using at least one additional co-feed. The ratio corresponds very well to a saturated hydrocarbon chain of infinite length. Elemental analyses of products from examples 5 and 6, which were performed solely on saw dust without an additional co-feed had hydrogen-to-carbon ratios of 1.68±0.03 suggesting presence of more unsaturated products.

Example 10. Hydrodeoxygenation of Dried Spruce Root

Saw dust from dried spruce root (2.68 g), rape-seed oil (5.63 g), diesel (5.63 g) and a catalyst prepared as described in Example 1 (673 mg) were mixed at room temperature. The inerted reactor was pressurized with hydrogen (122 bar). The reaction mixture was heated to 400° C. and held at that temperature for 120 min during which the maximum working pressure was 229 bars.

Reaction work-up was performed as outlined under "Experimental set-up" resulting in 11.1 g of a deep yellow-amber liquid (87% yield). NMR-data for the product (Tables 23 and 24).

The amount of deposited coke as calculated on the whole feed was 0.49%.

TABLE 23

¹H-NMR (CDCl3) results for Example 10 (normalized integrals)

| Example 10: ¹H-NMR signals | ppm | Integral |
|---|---|---|
| Carboxylic acid H (COOH) and aldehyde H (CHO) | 12-9 | 0 |
| Aromatic H | 9-6.2 | 0.80 |
| Olefin H | 6.2-4.5 | 0.35 |
| Aliphatic alcohol H, —CHOH or aliphatic ether —CHOR | 4.5-3.3 | 0.10 |
| Aliphatic H | 3.3-0 | 98.7 |

TABLE 24

Hydroxyl numbers for Example 9

| | Aliphatic OH (mmol/g) | Aromatic OH (mmol/g) | Carboxylic acid |
|---|---|---|---|
| Example 9 | 0.13 | 0.14 | 0.00 |

Example 11. Hydrodeoxygenation of Fresh Pine Bark

Saw dust from fresh pine bark (4.60 g), rape-seed oil (5.26 g), diesel (5.28 g) and a catalyst prepared as described in Example 1 (693 mg) were mixed at room temperature. The inerted reactor was pressurized with hydrogen (118 bar). The reaction mixture was heated to 400° C. and held at that temperature for 120 min. The maximum working pressure reached 236 bars.

Figure 8:
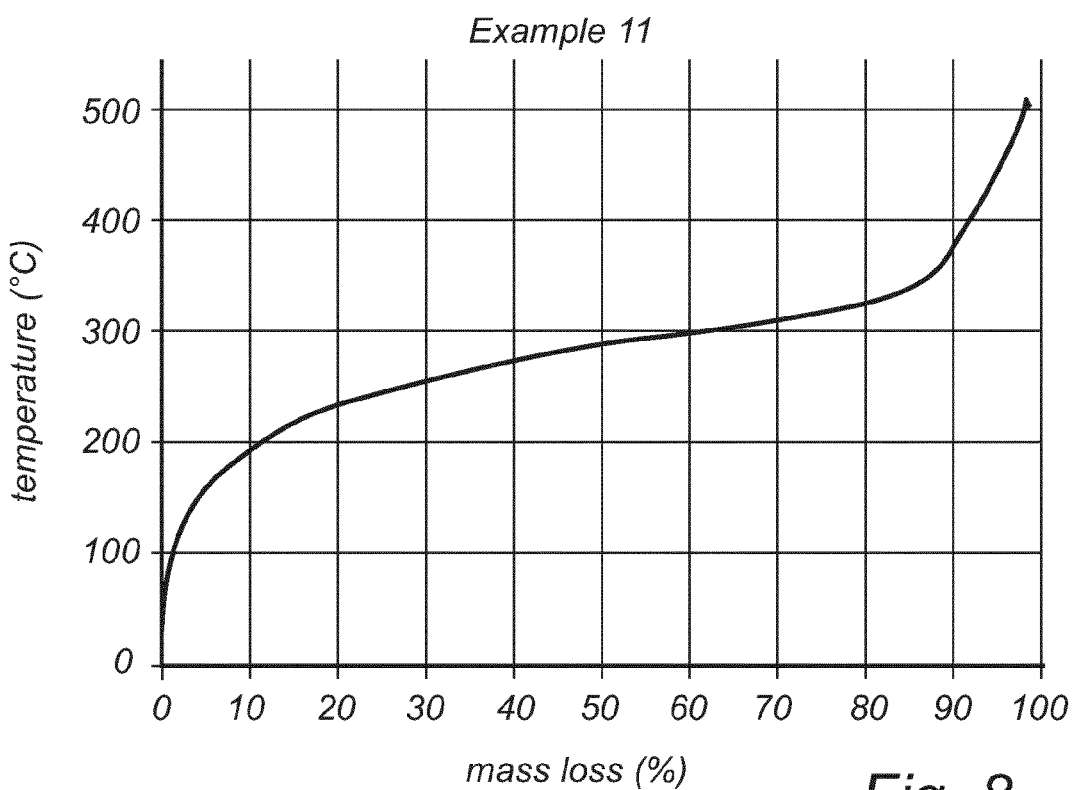
FIG. 8 shows the TGA curve for the product of Example 11.

Reaction work-up was performed as outlined under "Experimental set-up" resulting in 11.3 g of a dark brown liquid (89% yield). NMR-data for the product is shown in Tables 25 and 26 and the TGA curve in FIG. 8.

The amount of deposited coke as calculated on the whole feed was 0.44%.

TABLE 25

¹H-NMR (CDCl₃) results for Example 11 (normalized integrals)

| Example 11: ¹H-NMR signals | ppm | Integral |
|---|---|---|
| Carboxylic acid H (COOH) and aldehyde H (CHO) | 12-9 | 0 |
| Aromatic H | 9-6.2 | 1.22 |
| Olefin H | 6.2-4.5 | 0.39 |
| Aliphatic alcohol H, —CHOH or aliphatic ether —CHOR | 4.5-3.3 | 0.08 |
| Aliphatic H | 3.3-0 | 98.32 |

TABLE 26

Hydroxyl numbers for Example 11

| | Aliphatic OH (mmol/g) | Aromatic OH (mmol/g) | Carboxylic acid |
|---|---|---|---|
| Example 11 | 0.003 | 0.010 | 0.00 |

Example 12. Hydrodeoxygenation of Pine Saw Dust

Pine saw dust (3.77 g), rape-seed oil (11.3 g) and a catalyst prepared as described in Example 1 (685 mg) were mixed at room temperature. The inerted reactor was pressurized with hydrogen (119 bar). The reaction mixture was heated to 420° C. and a maximum working pressure of 216 bars and held at that temperature for 120 min.

Reaction work-up was performed as outlined under "Experimental set-up" resulting in 10.5 g of a dark brown hydrocarbon liquid (83% yield). NMR-data for the product is shown in Table 27. Elemental analysis of the liquid hydrocarbon product: C 84.9%, H, 14.4%, N<0.1%, S<0.05%, O, 0.7% (by difference). Based on these values the calculated H/C-ratio is 2.02.

The amount of deposited coke as calculated on the whole feed was 0.28%.

TABLE 27

¹H-NMR (CDCl₃) results for Example 12 (normalized integrals)

| Example 12: ¹H-NMR signals | ppm | Integral |
|---|---|---|
| Carboxylic acid H (COOH) and aldehyde H (CHO) | 12-9 | 0 |
| Aromatic H | 9-6.2 | 0.99 |
| Olefin H | 6.2-4.5 | 0.31 |
| Aliphatic alcohol H, —CHOH or aliphatic ether —CHOR | 4.5-3.3 | 0 |
| Aliphatic H | 3.3-0 | 98.7 |

Example 13. Hydrodeoxygenation of Pine Saw Dust

Pine saw dust (3.76 g), rape-seed oil (5.65 g), diesel (5.66 g) and a catalyst prepared as described in Example 1 (685 mg) were mixed at room temperature. The inerted reactor was pressurized with hydrogen (120 bar). The reaction mixture was heated to 420° C. and a maximum working pressure of 249 bars at that temperature for 13 min.

Reaction work-up was performed as outlined under "Experimental set-up" but without the final drying of the solids since these later were used in Example 14. The experiment resulted in 11.7 g of an amber liquid (88% yield). NMR-data for the product is shown in Tables 28 and 29.

TABLE 28

¹H-NMR (CDCl₃) results for Example 13 (normalized integrals)

| Example 13: ¹H-NMR signals | ppm | Integral |
|---|---|---|
| Carboxylic acid H (COOH) and aldehyde H (CHO) | 12-9 | 0 |
| Aromatic H | 9-6.2 | 0.88 |
| Olefin H | 6.2-4.5 | 0.62 |
| Aliphatic alcohol H, —CHOH or aliphatic ether —CHOR | 4.5-3.3 | 0.10 |
| Aliphatic H | 3.3-0 | 98.4 |

TABLE 29

Hydroxyl numbers for Example 13

| | Aliphatic OH (mmol/g) | Aromatic OH (mmol/g) | Carboxylic acid |
|---|---|---|---|
| Example 13 | 0.15 | 0.17 | 0.00 |

Figure 9:
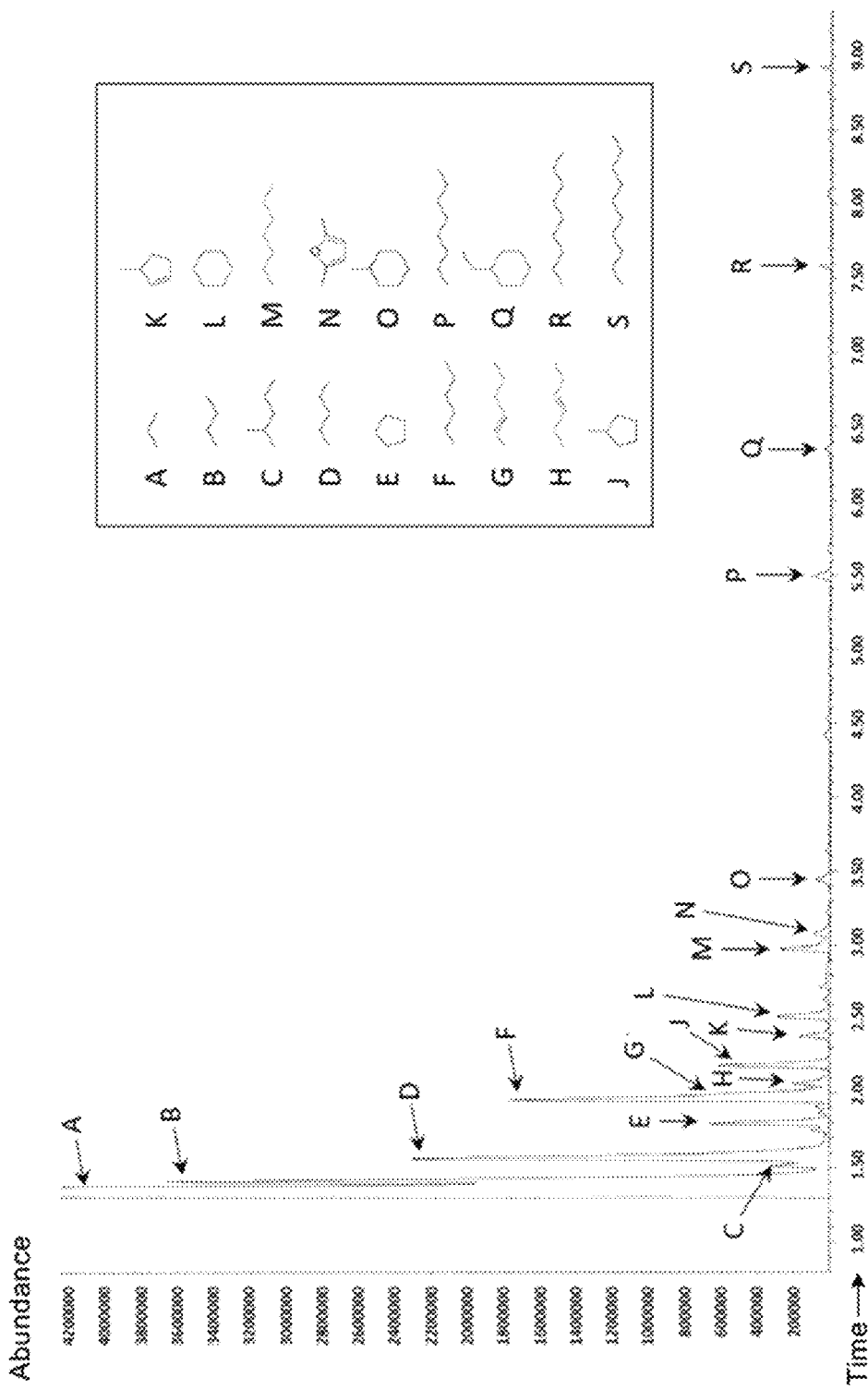
FIG. 9 shows the results of headspace gas chromatography/mass spectroscopy (GCMS) analysis of the product obtained in Example 13.

The organic product obtained in Example 13 was analyzed by gas chromatography/mass spectroscopy (GCMS) where the product was heated to 70° C. and the headspace was injected onto the column. The chromatogram with some identified products is shown in FIG. 9.

Example 14. Hydrodeoxygenation of Pine Saw Dust

Pine saw dust (3.76 g), rape-seed oil (5.7 g), diesel (5.91 g) and recycled catalyst from Example 13 (277 mg) were mixed at room temperature. The inerted reactor was pressurized with hydrogen (120 bar). The reaction mixture was heated to 420° C. and a maximum working pressure of 250 bars and held at that temperature for 13 min.

Following the procedures outlined in "Experimental set-up" resulted in 8.54 g of an amber liquid (65% yield). NMR-data for the product is shown in Tables 30 and 31.

TABLE 30

$^1$H-NMR (CDCl$_3$) results for Example 14 (normalized integrals)

| Example 14: $^1$H-NMR signals | ppm | Integral |
|---|---|---|
| Carboxylic acid H (COOH) and aldehyde H (CHO) | 12-9 | 0 |
| Aromatic H | 9-6.2 | 0.88 |
| Olefin H | 6.2-4.5 | 0.58 |
| Aliphatic alcohol H, —CHOH or aliphatic ether —CHOR | 4.5-3.3 | 0.53 |
| Aliphatic H | 3.3-0 | 98.02 |

TABLE 31

Hydroxyl numbers for Example 14

| | Aliphatic OH (mmol/g) | Aromatic OH (mmol/g) | Carboxylic acid |
|---|---|---|---|
| Example 14 | 0.30 | 0.24 | 0.0075 |

Example 15. Comparative Example—Blank Trial

Pine saw dust (3.76 g), was charged at room temperature. The inerted reactor was pressurized with hydrogen (81 bar). The reaction mixture was heated to 420° C. and held at that temperature for 13 min. The maximum pressure peaked at 248 bars. A black solid material, but no liquid product could be isolated (0% yield).

Additionally, a preceding experiment was performed with an initial hydrogen pressure. However, this experiment had to be terminated before the desired reaction temperature had been reached due to a too high pressure.

Example 16. Hydrodeoxygenation of Pine Saw Dust

Pine saw dust (10.2 g) and a catalyst prepared as described in Example 1 (1028 mg) were mixed at room temperature. The inerted reactor was pressurized with hydrogen (120 bar). The reaction mixture was heated to 420° C. and held at that temperature for 120 min where the maximum working pressure was 263 bars.

After cooling of the reactor, the content was transferred to a centrifuge vial and centrifuged as outlined in the "Experimental set-up". An amber organic phase and a colorless aqueous phase could be separated using a glass Pasteur pipette rendering 2937 mg and 3646 mg of the two phases, respectively. The phases were clearly separated but due to the practical difficulty to manually separate the phases using a Pasteur pipette on this small scale, an aliquot of 467 mg remained.

A sample of the organic phase was removed for elemental analysis. The remaining 2296 mg of the organic phase was washed with 2854 mg of ultra-pure water using a vortex mixer followed by centrifugation. The wash water volume was chosen in order to maintain the original ratio between the recovered organic and aqueous phase volumes (2296/2937*3646=2850 mg). The washed organic phase was sent for elemental analysis. The aqueous phase after reaction and the aqueous wash phase were sent for elemental analysis and analysis of total organic carbon (TOC). TOC results and trace element analysis are shown in Table 32.

TABLE 32

Trace element analysis, halogen content, and TOC analysis.

| | After reaction | | After wash | |
|---|---|---|---|---|
| Element or analysis | Organic phase (mg/kg) | Aqueous phase (mg/L) | Organic phase (mg/kg) | Aqueous phase (mg/L) |
| Al | <1 | 0.0357 | <1 | 0.0187 |
| As | <0.006 | <0.0005 | <0.006 | <0.0005 |
| Ca | <6 | 0.011 | <6 | $0.105 \times 10^{-3}$ |
| Cd | 0.0124 | 0.0297 | 0.0126 | 0.00655 |
| Co | <0.006 | $0.99 \times 10^{-3}$ | <0.006 | $<0.5 \times 10^{-3}$ |
| Cr | <0.01 | 0.00152 | <0.01 | $<0.5 \times 10^{-3}$ |
| Cu | <0.01 | 0.00302 | <0.01 | 0.00286 |
| Fe | <0.06 | $0.00506 \times 10^{-3}$ | <0.06 | $<0.0005 \times 10^{-3}$ |
| Hg | <0.001 | <0.0001 | <0.001 | <0.0001 |
| K | <0.6 | 0.724 | <0.6 | 0.00028 |
| Mg | <1 | 0.0182 | <1 | $0.087 \times 10^{-3}$ |
| Mn | <0.01 | $0.93 \times 10^{-3}$ | <0.01 | $0.54 \times 10^{-3}$ |
| Mo | 5.73 | 47.8 | 0.615 | 8.15 |
| Na | <0.6 | 0.0456 | <0.6 | 0.00527 |
| Ni | 0.403 | 0.307 | 0.0539 | 0.003 |
| P | <1 | 13.9 | <1 | $<5 \times 10^{-3}$ |
| Pb | 0.00332 | <0.0005 | 0.00335 | <0.0005 |
| S | 6.98 | 0.0969 | 5.76 | 0.00369 |
| Si | <10 | 0.0139 | <10 | 0.00509 |
| V | <0.001 | | <0.001 | |
| Zn | <0.1 | 0.00494 | <0.1 | 0.00439 |
| B | | 5.31 | | 3.04 |
| Ba | | $1.33 \times 10^{-3}$ | | $0.31 \times 10^{-3}$ |

TABLE 32-continued

Trace element analysis, halogen content, and TOC analysis.

| | After reaction | | After wash | |
|---|---|---|---|---|
| Element or analysis | Organic phase (mg/kg) | Aqueous phase (mg/L) | Organic phase (mg/kg) | Aqueous phase (mg/L) |
| Sr | | $5.26 \times 10^{-3}$ | | $0.58 \times 10^{-3}$ |
| Br | | 1.34 | | <0.1 |
| Cl | | 0.0392 | | $<5 \times 10^{-3}$ |
| I | | 0.485 | | <0.1 |
| Total Organic Carbon (TOC) | | 5840 | | 3320 |

When comparing the initial hydrocarbon phase and the initial water phase it is clearly seen that metals (e.g. Al, Ca, Cd, Co, Cr, Cu Hg, K, Mg, Mn, Na, Ni, Pb and Zn) accumulated in the water phase. This tendency was also seen for phosphorous and sulphur.

When the initial hydrocarbon phase was separated and washed with clean water, forming a second hydrocarbon phase and a second water phase, the tendency was that the hydrocarbon phase was further purified with respect to e.g. cadmium, molybdenum, nickel, and sulphur. When comparing the first and second water phase, it appears that already the first water phase forming in the reaction was effective in extracting impurities from the hydrocarbon phase, but also that the wash step was capable of cleaning the hydrocarbon phase further, producing a high-quality product with a low concentration of impurities.

In combination with the elemental analysis, the results show efficient removal of halogens from the organic phases as indicated by the content of these in the two aqueous phases as well as small or negligible losses of organic content into the water phase. This has an additional advantage in that a low TOC corresponds to a low chemical oxygen demand (COD) and low biological oxygen demand (BOD) so that the water phase can be discharged, following precipitation of metals, into an industrial or municipal wastewater cleaning plant.

Example 17. Determination of Catalyst Primary Particle Size Distribution

An aliquot of the catalyst prepared according to Example 1 was dispersed in pure dodecane and analyzed by laser diffraction on a Malvern Mastersizer 2000 after in-situ ultra-sonication for 120 seconds. The result is shown in FIG. 10 indicating a median particle size of 6.2 μm.

Example 18. Isolation of Particles from the Catalyst Slurry

An aliquot of the catalyst prepared according to Example 1 was washed and slurried in pure pentane with intermediate centrifugation to separate off the solvent from the solid particles. The procedure was repeated five times which rendered a pellet that was dried under vacuum at room temperature for 24 hours after it was de-pressurized under an inert nitrogen atmosphere and stored there. Samples were sent for elemental analysis.

Example 19. Optical Microscopy on Catalyst Particles

Figure 11:
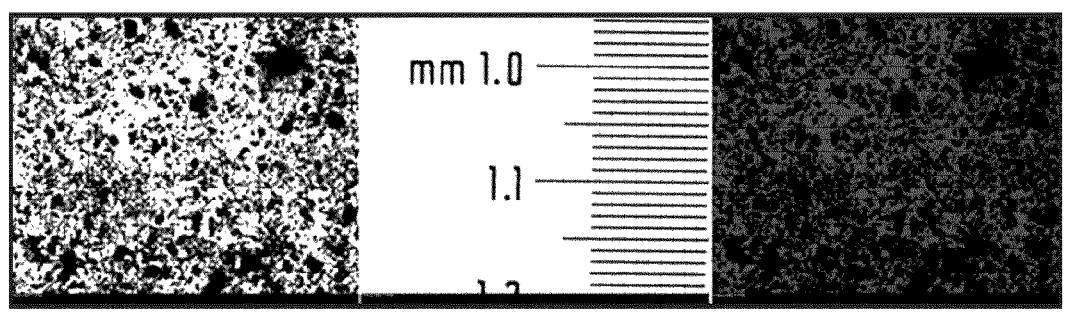
FIG. 11 shows photographs of the catalyst particles prepared according to Example 18, taken with optical microscopy at 50 times magnification using non-polarized and polarized light (left and right, respectively).

A sample was prepared according to Example 18 and analyzed on an Olympus BX51 microscope. The microscope pictures taken at 50 times magnification using non-polarized and polarized light (left and right, respectively) are shown in FIG. 11. Visualization using polarized light gave no indication of any crystalline entities in the sample.

Example 20. X-Ray Powder Diffraction (XRPD) Analysis on Catalyst Particles

Figure 12:
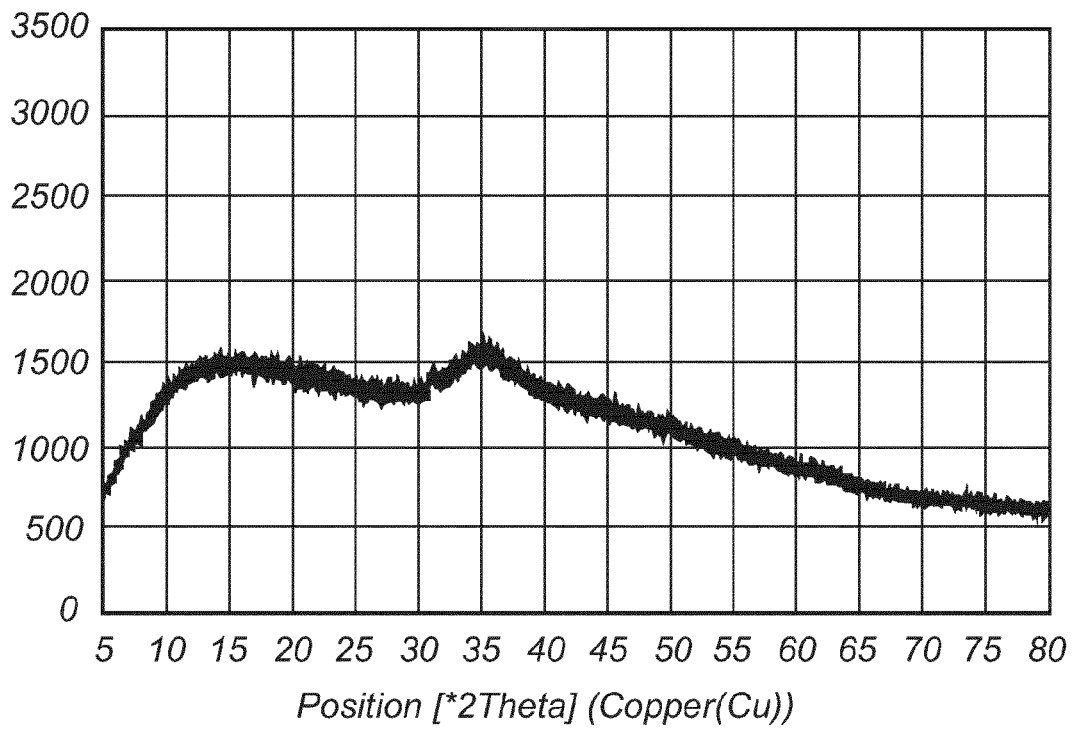
FIG. 12 shows the XRPD diffractogram of a catalyst sample produced according to the process disclosed herein (Example 18).
Figure 13:
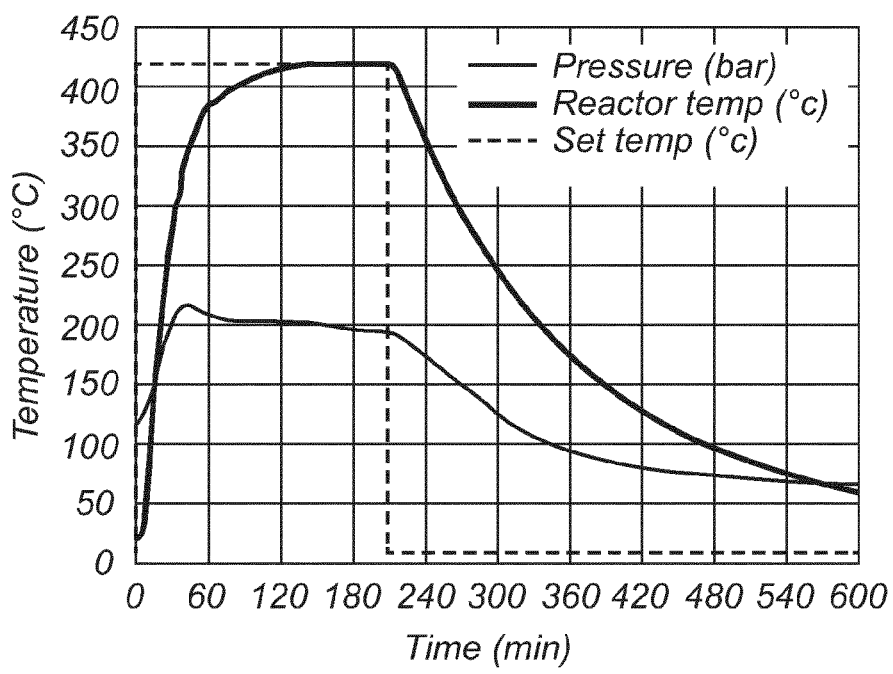
FIG. 13 shows the reaction profile corresponding to Example 12, showing how pressure and reactor temperature developed over time, during the process.

A sample was prepared according to Example 18 and analyzed on a PANalytical X'Pert PRO difffractometer. The result is shown in FIG. 12. The XRPD diffractogram shows no XRPD peaks that would suggest any degree of crystallinity and together with the fact that the particles were large enough (average 6.2 μm) to be detected by XRPD the conclusion was that the catalyst sample was amorphous.

Example 21. Influence of Reaction Temperature and Time

Experiments were conducted at 380, 400 and 420° C. using the same equipment and procedure as described in the examples above. The formation of char decreased with increasing temperatures. At 400° C., the formation of char was approximately 4 times higher than at 420° C., and at 380° C., a 10-fold amount of char was formed. Thus, based on the batch experiments conducted so far, 420° C. appears to be an optimal temperature.

The batch experiments were run at the specified temperatures for 13 and 120 minutes respectively. The hydrocarbon yield was higher at the shorter reaction time. The present inventor contemplates that this can be due to a possible cracking of hydrocarbons, resulting in the formation of highly volatile, short chain hydrocarbons which are difficult to capture and quantify in the experimental setting.

Example 22. Comparison with Homogeneous Molybdenum (Pre)Catalyst

The efficacy of the catalyst (produced as disclosed in Example 1) was compared to a homogeneous molybdenum (pre-)catalyst in the form of molybdenum(III) 2-ethylhexanoate, 2-ethylhexanoic acid, molybdenum(III) salt, CAS No. 106414-11-3, published by T. Cyr et al. U.S. Pat. No. 5,578,197, 1996.

Both experiments used pinewood sawdust (DS, 84.7%, particle size 1.0-1.4 mm sieved) as the lignocellulosic feed. This was mixed with commercial diesel fuel to a slurry (25% sawdust, w/w), the catalyst was added, and the experiment performed as outlined in the "Experimental set-up". The results are shown in the tables below (Tables 33-35).

TABLE 33

Catalyst comparison—yield

| Test run | Biomass (%) | Diesel (%) | Catalyst (%) | Temperature (° C.) | Pressure (bar) | Reaction time (min) | Hydrocarbon yield (%) |
|---|---|---|---|---|---|---|---|
| Example 3 Inventive catalyst | 25 | 72 | 1.6 | 420 | 123.2 | 120 | 89.2 |
| Example 7 Mo(ethex)3 | 25 | 68 | 1.2 | 420 | 120 | 120 | 94.2 |

TABLE 34

Catalyst comparison - difference in hydrogen consumption

| Test run | Weight (mg) | Load (w-% of wet biomass) | Load (w-% of total feed) | $H_2$ consumption (mg) |
|---|---|---|---|---|
| Example 3 | 614 | 6.51 | 1.64 | 302 |
| Example 7 | 2642 | 4.69 | 1.19 | 425 |

TABLE 35

Catalyst comparison - recovery of catalyst and char formation

| Test run | Recovery of catalyst (washed and dry, mg) | Recovery (%) | Char in relation to biomass (%) | Char in relation to total feed (%) |
|---|---|---|---|---|
| Example 3 | 296 | 48.2 | 1.30 | 0.33 |
| Example 7 | 655 | 24.8 | 3.93 | 1.00 |

The results indicate that the novel catalyst disclosed herein performs at least equally well as the homogeneous molybdenum catalyst in terms of yield and that it outperforms the same with regard to the formation of char, and the possibility to recover the catalyst. In the experiments performed so far, the formation of char was 3 times higher using the commercial catalysts. Based on the city gas resembling smell of the gaseous phase, the novel catalyst was more efficient in driving the reaction towards shorter hydrocarbon chains.

Experiments have also been performed without the addition of catalyst, and otherwise subjected to the same temperature and pressure. No liquefaction took place in the absence of catalyst. The lignocellulosic material was blackened but structurally intact.

Example 23. Influence of Co-Feed

In most experiments, the feed was mixed with a liquid co-feed, chosen from rape seed oil, diesel oil, or a mixture of both. In two comparative experiments (D, E), the pressure vessel was charged with lignocellulosic starting material and catalyst, without any added liquid co-feeds. The results indicate that the addition of rape seed oil increases the formation of char compared to the use of diesel.

The yield remained high and fairly stable for different starting materials, indicating that the method is robust and that the catalyst is capable of efficient interaction with the lignocellulosic material particles, regardless of particle size. The results are presented in Table 36 below.

TABLE 36

Influence of co-feed/-s

| Experiment | Co-feed/-s<br>R = rape seed oil<br>D = diesel<br>— = none | Catalyst<br>0 = none<br>1 = inventive catalyst<br>2 = Mo(ethex)3 | Yield (%) |
|---|---|---|---|
| A | R + D | 1 | 88.8 |
| B | D | 1 | 89.2 |
| D | — | 1 | 74.5 |
| C | R + D | 1 (¼ amount) | 88.4 |
| M | R + D | 1 | 86.0 |
| G | R + D | 1 | 89.7 |
| H | R + D | 1 | 92.2 |
| K | R + D | 1 | 89.7 |
| J | R + D | 1 | 89.1 |
| P | R + D | 1 | 91.1 |
| N | R + D | 1 | 91.9 |
| E | — | 1 | 69.4 |
| L | D | 1 | 77.8 |
| F | D | 2 | 94.2 |
| Q | R + D | 1 | 92.5 |
| R | R + D | 1 | 87.6 |
| S | R | 1 | 85.5 |

Surprisingly the reaction could be performed also without the use of any liquid hydrocarbon co-feed. In two experiments (Examples 5 and 6) the yield was 74.5 and 88.4% respectively, and the formation of char was significantly less than when rape seed oil, diesel or a mixture thereof was used. The results indicate that the catalyst disclosed herein can be successfully used also without a hydrocarbon co-feed.

While not wishing to be bound by any particular theory, the inventor speculates that the catalyst has a particle size and charge that allows it to blend very well with the lignocellulosic starting material.

Example 24. Catalyst Recycling

The novel catalyst used in a batch reaction (Example 13) was collected by centrifugation, washed, and used as catalyst in a subsequent reaction (Example 14). The yield in the first run was 88% and in the second 65% which can be considered satisfactory and it indicates that the catalyst can indeed be recycled. Amount losses in recovered catalyst between the two experiments are imminent due to the small scale so a direct comparison is not applicable.

Example 25. Hydrodeoxygenation of Pine Saw Dust on 0.5 L Scale

Pine saw dust (40.1 g) and a catalyst prepared as described in Example 1 (4.64 g) were mixed at room temperature. The inerted reactor was pressurized with hydrogen (100 bar). The reaction mixture was heated to 420° C. and held at that temperature for 120 min where the maximum working pressure was 235 bars. After cooling of the reactor, the content was transferred to a centrifuge vial and centrifuged. After conventional work-up as outlined under "Experimental set-up" 16.0 g of an amber hydrocarbon product, 17.3 g of a transparent water phase and 1.7 g of solid product could be isolated. The yield, based on theoretical calculations, for the hydrocarbon and water phases were 69% and 76%, respectively. No coking or solid product, other than the weight of the catalyst, could be detected.

TABLE 37

$^1$H-NMR (CDCl3) results for Example 25 (normalized integrals)

| Example 25: $^1$H-NMR signals | ppm | Integral |
|---|---|---|
| Carboxylic acid H (COOH) and aldehyde H (CHO) | 12-9 | — |
| Aromatic H | 9-6.2 | 8.16 |
| Olefin H | 6.2-4.5 | 0.17 |
| Aliphatic alcohol H, —CHOH or aliphatic ether —CHOR | 4.5-3.3 | 0 |
| Aliphatic H | 3.3-0 | 91.67 |

Example 26. Fractional Distillation of a Hydrocarbon Product from Example 25

Figure 18:
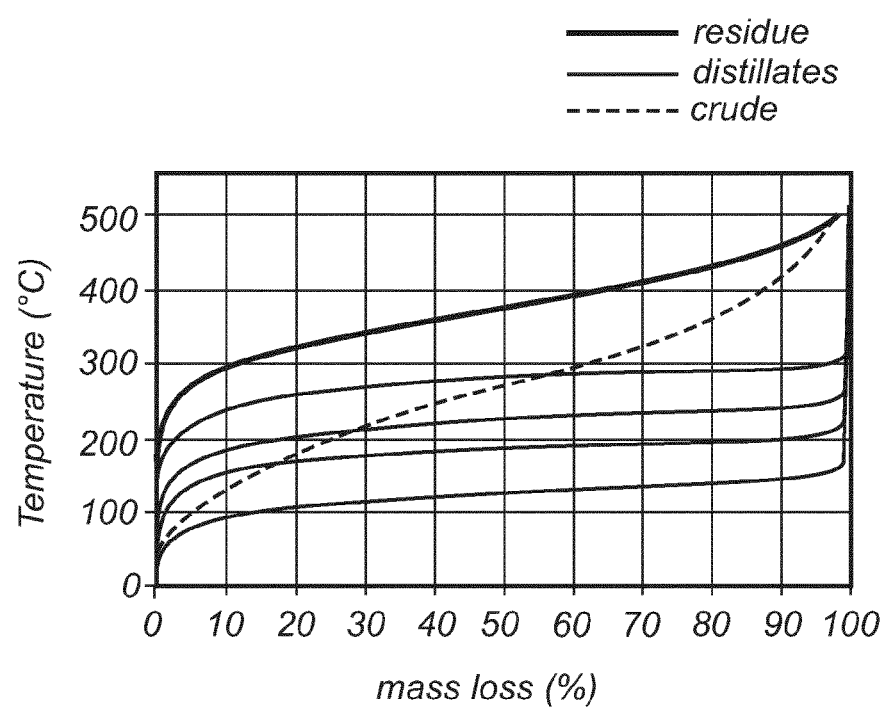
FIG. 18 shows the TGA curves for the crude hydrocarbon product as well as distillate fractions from Example 26.

An aliquot of the hydrocarbon product generated in Example 25 was subjected to fractional distillation using a packed column with a return flow from a reflux condenser. Three fractions were isolated and analyzed using TGA. Data for the distillate fractions and for the crude are shown in FIG. 18.

Figure 14:
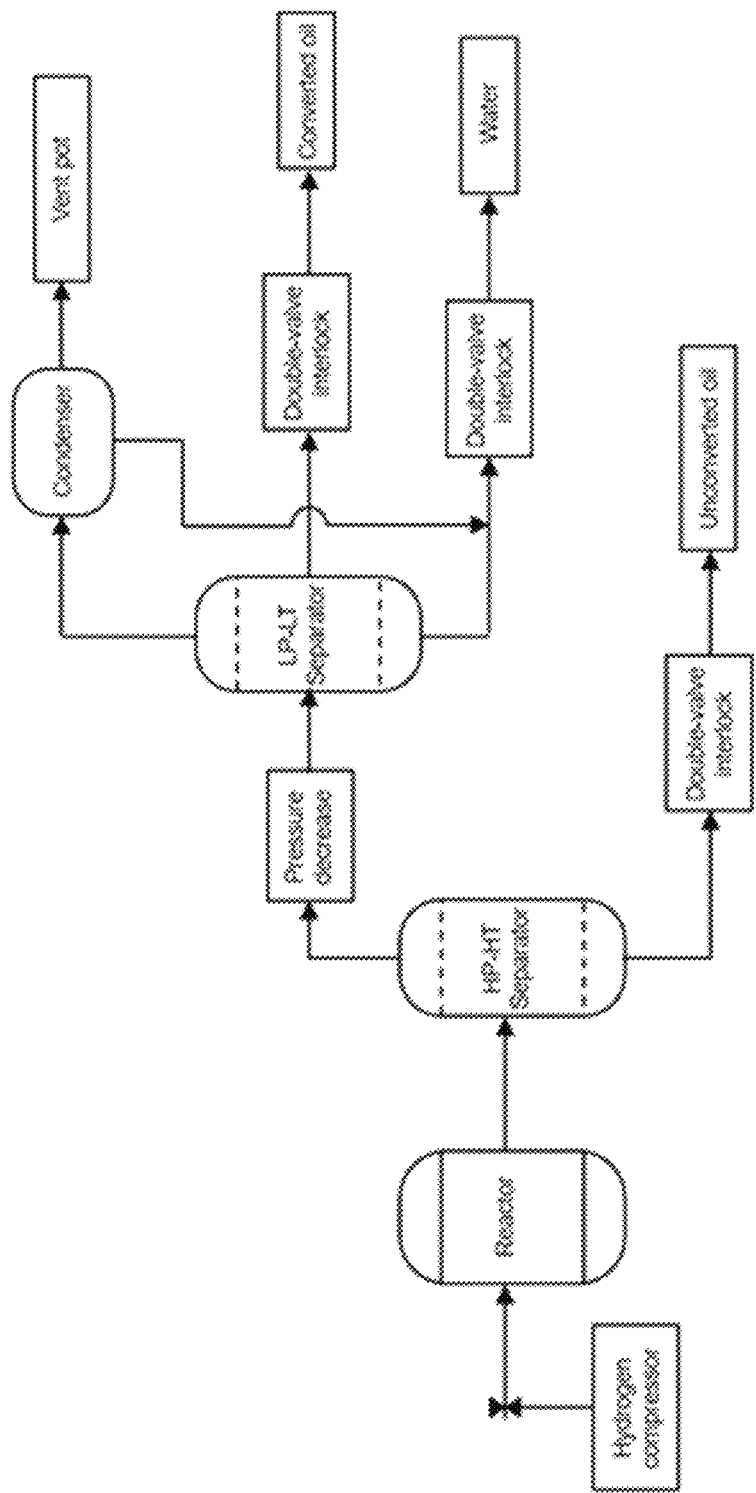
FIG. 14 shows a schematic overview of the slurry hydrocracker (SHC) pilot plant from Example 27 operated in semi batch mode.

Example 27. Hydrodeoxygenation of Torrefied Pine Saw Dust on 2 L Scale Run in Semi-Batch Mode Pine saw dust, which had been torrefied at 300° C. (106.5 g), 388 g commercial diesel fuel and a catalyst prepared according to Example 1 distributed as an Isopar™ L slurry containing 4.43 g catalyst solid content and 53.6 g Isopar™ L, were added to a 2 L slurry hydrocracker reactor (FIG. 14). The contents were heated to 420° C. under a stream of hydrogen gas at 140 bar pressure and an average flow of 298 standard litres per hour (SLPH) and the semi-batch reaction was allowed to take place for 2 hours. The composition of the gas outstream was constantly monitored during the reaction.

After reaction 442 g hydrocarbon products and 2.04 g solids were recovered from the reactor. From the HP-HT-Separator 46 g of hydrocarbon phase and 2.8 g of water could be isolated. The reaction gases contained 7.3 g methane, 7.7 g carbon dioxide, 1.4 g ethene, 1.6 g ethane and 0.8 g propane. The total yield of hydrocarbons (liquid+gases) was 97.8%.

Elemental analyses: Reactor liquid hydrocarbon product C, 85.4%, H 14.4%, N, 0.1%, S, 0.05%, O, 0.2% (by difference). Based on these values the calculated H/C-ratio is 2.01.

HP-HT-Separator hydrocarbon phase C, 83.4%, H, 14.3%, N, 0.1%, S 0.52%, O, 1.78% (by difference). Based on these values the calculated H/C-ratio is 2.04.

TABLE 38

$^1$H-NMR (CDCl3) results for the Reactor product in Example 27 (normalized integrals)

| Example 27: $^1$H-NMR signals | ppm | Integral |
|---|---|---|
| Carboxylic acid H (COOH) and aldehyde H (CHO) | 12-9 | — |
| Aromatic H | 9-6.2 | 0.74 |
| Olefin H | 6.2-4.5 | 0.22 |
| Aliphatic alcohol H, —CHOH or aliphatic ether —CHOR | 4.5-3.3 | 0.06 |
| Aliphatic H | 3.3-0 | 98.99 |

TABLE 39

$^1$H-NMR (CDCl3) results for the HP-HT-Separator product in Example 27 (normalized integrals)

| Example 27: $^1$H-NMR signals | ppm | Integral |
|---|---|---|
| Carboxylic acid H (COOH) and aldehyde H (CHO) | 12-9 | — |
| Aromatic H | 9-6.2 | 0.96 |
| Olefin H | 6.2-4.5 | 2.01 |
| Aliphatic alcohol H, —CHOH or aliphatic ether —CHOR | 4.5-3.3 | 0.58 |
| Aliphatic H | 3.3-0 | 96.40 |

Figure 17:
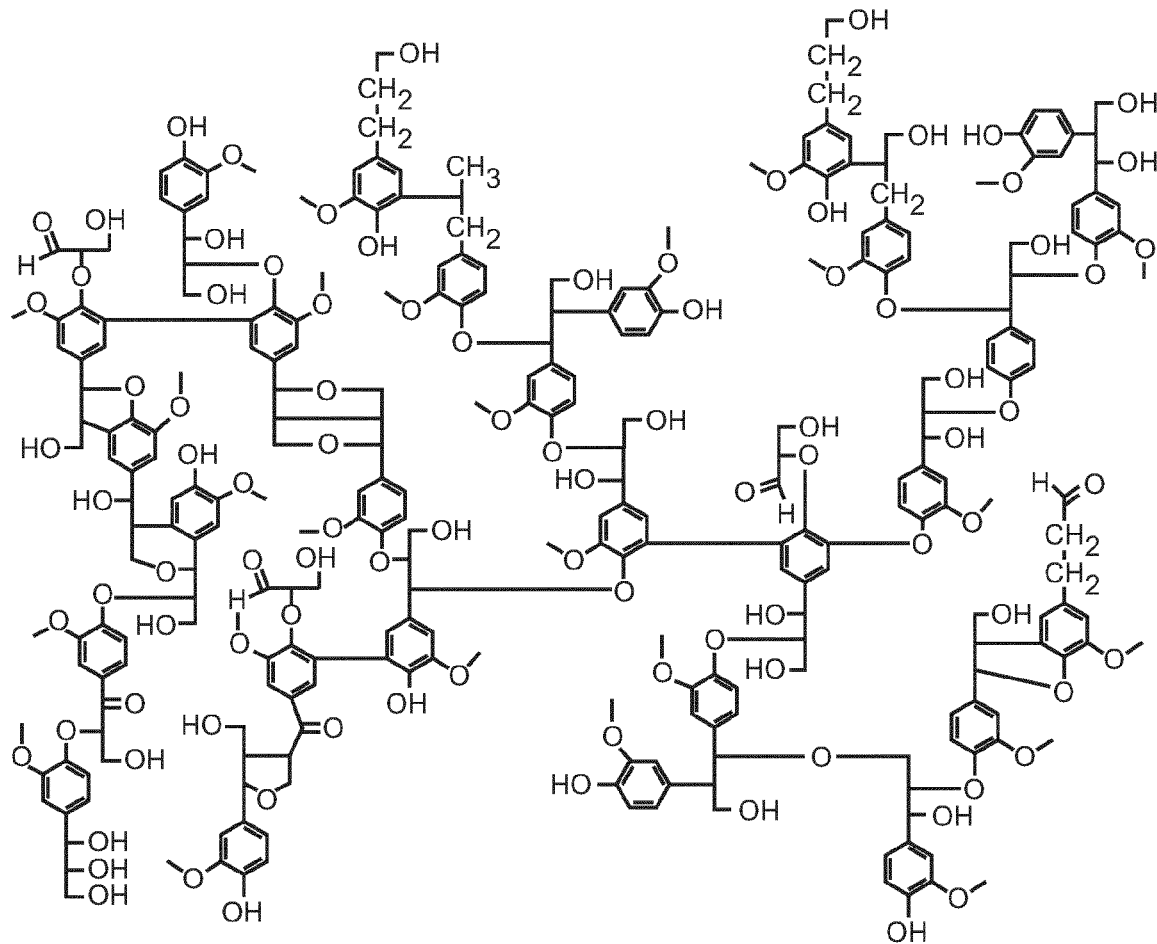
FIG. 17 illustrates a representative repeating unit structure of lignin.

GC-SIMDIST data for the reactor and separator fractions are shown in FIG. 17.

Advantages

The results show that the catalyst performed well for different raw materials, with differing particle size, humidity and composition, indicating that the catalyst and the process is applicable to a variety of starting materials.

The results also indicate that the process is robust with regard to the water content, as this did not appear to have any influence on the yield or on the formation of char.

Interestingly, the process performed well on many different feeds, including municipal waste, exemplified by a finely ground mixture containing wood, plastics, paint and sand (Example not shown), always producing three, by gravity, easily separable phases of which one is essentially liquid water, the second is a liquid hydrocarbon fraction, and the third is a gas phase consisting of lighter hydrocarbons. The gaseous hydrocarbon phase was shown to comprise lighter hydrocarbons such as propane and n-butane. A difference in the formation of char was however observed.

The lowest amount of char (0.2-0.4%) was recorded for pure sawdust, whereas the experiment using municipal waste resulted in the formation of 10% char, possibly including residual sand and metal. The other forestry byproducts (bark, roots, branches, needles) produced only around 1.5% char. Any solid by-products from the process above (coke, char, asphaltenes) will amount to less than 1% of the weight of the starting lignocellulosic feedstock.

An important advantage of the process disclosed herein is the low oxygen content of the resulting product, a refinery compatible hydrocarbon fraction. The chemical analysis also indicated that this fraction is substantially free from halogens, salts and metal contaminants, and that these components are concentrated in the aqueous fraction which can be easily separated from the liquid hydrocarbon fraction. High purity is an important requirement if the product is subjected to further refining, as impurities would contaminate and potentially incapacitate catalysts used in the refineries. The removal of halogens is also important for reducing the risk of corrosion of down-stream process equipment.

The liquid hydrocarbon phase was shown to have a total content of halogens and trace elements below 40 ppm, and no single element is above 10 ppm. Further, said liquid hydrocarbon phase has a carbon content above 83% by weight, a hydrogen content above 12% by weight, and an oxygen content less than 2.5% by weight. The hydrocarbon phase was also shown to have low hydroxyl numbers from 0.0-1.6 mmol/g as determined by $^{31}$P-NMR.

Further, as noted above, the TOC of the water phase was low, below 0.6% per weight, making it a trouble-free effluent that can be recirculated in industrial processes, or discharged without negative impact.

Another advantage is that fewer process steps are needed, compared to similar technologies currently in use. The examples indicate that little or no pretreatment of the raw material is necessary. This is an advantage compared to conventional processes where the raw material is dried, ground, crushed, and/or sieved.

Another advantage is that the process is applicable to many different types of lignocellulosic raw materials, such as but not limited to forestry byproducts, agriculture byproducts, waste fractions etc.

Additionally, compared to many other processes for the conversion of lignocellulosic raw materials to liquid hydrocarbons, the present processes exhibit a higher yield. Without wishing to be bound by any theory, the present inventor speculates that the process parameters, for example the relatively low temperature and the efficient working of the inventive catalyst helps to avoid thermal degradation and minimizes the formation of char, coke and fouling, and thus improves the yield.

An important advantage with the inventive catalyst is that it is relatively cheap and easy to manufacture. Further, as it can be used as such, without being bound to a carrier, it can be added at different stages of the process, for example already when the starting material is ground, and thus be intimately mixed with the starting material. The absence of a carrier also minimizes the volume of the catalyst stream, which simplifies handling and in particular recovery. It was shown that the catalyst could be easily separated from the liquid product phases, for example by filtration.

Without further elaboration, it is believed that a person skilled in the art can, using the present description, including the examples, utilize the present aspects and embodiments to their fullest extent. Also, although the disclosure has been presented herein with regard to its preferred embodiments, which constitute the best mode presently known to the inventor, it should be understood that various changes and modifications as would be obvious to one having the ordinary skill in this art may be made without departing from the scope of the disclosure which is set forth in the claims appended hereto.

Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Terms, definitions and embodiments of all aspects of the present disclosure apply mutatis mutandis to the other aspects of the present disclosure.

The invention claimed is:

1. A process for the conversion of a lignocellulosic starting material into an aqueous phase and a hydrocarbon phase, wherein the lignocellulosic starting material being a whole and non-fractionated lignocellulosic material, an amorphous and unsupported sulfided nickel-molybdenum catalyst, and optionally a co-feed, are mixed and subjected to elevated pressure and a temperature in the interval of 350-450° C. in the presence of hydrogen gas, thereby converting the lignocellulosic starting material to the aqueous phase and the hydrocarbon phase.

2. The process according to claim 1, wherein the content of sulfur(S) in said amorphous and unsupported sulfided nickel molybdenum catalyst with respect to the content of molybdenum (Mo) is from 0.1 to 1.0.

3. The process according to claim 1, wherein the content of nickel (Ni) in said amorphous and unsupported sulfided nickel molybdenum catalyst with respect to the content of molybdenum (Mo) is from 0.1 to 0.2.

4. The process according to claim 1, wherein said co-feed is present, and wherein the amorphous and unsupported sulfided nickel-molybdenum catalyst is mixed with said lignocellulosic starting material in the form of a slurry of catalyst particles in said co-feed.

5. The process according to claim 4, wherein said co-feed is chosen from a vegetable oil, a vegetable fat, a liquid hydrocarbon, and/or a re-circulated product obtained in said process.

6. The process according to claim 5, wherein said co-feed is a mixture of the vegetable oil and the liquid hydrocarbon being a fossil or renewable hydrocarbon.

7. The process according to claim 1, wherein no co-feed is present in said process.

8. The process according to claim 1, wherein said hydrocarbon phase has an oxygen content of less than 2.5% by weight.

9. The process according to claim 1, wherein the lignocellulosic starting material has not been subjected to thermochemical treatment prior to being subjected to said process.

10. The process according to claim 1, wherein the elevated pressure is in an interval of 60-300 bar.

11. The process according to claim 1, wherein the amorphous and unsupported sulfided nickel-molybdenum catalyst is the only catalyst present in the process.

12. An amorphous and unsupported nickel-molybdenum sulfide catalyst, wherein said amorphous and unsupported nickel-molybdenum sulfide catalyst has an empirical formula with regard to molybdenum (Mo), nickel (Ni) and sulfur(S):

$$Mo_xNi_yS_z$$

wherein x=1, 0.1<y<0.2 and z above 0≤1.0.

13. The catalyst according to claim 12, wherein said catalyst has a particle size distribution with a median value of 1-50 μm as determined by laser diffraction.

14. A process for the conversion of a lignocellulosic starting material into an aqueous phase and a hydrocarbon phase, wherein a mixture of the lignocellulosic starting material being a whole and non-fractionated lignocellulosic material, a catalyst according to claim 12, and optionally a co-feed, is subjected to elevated pressure and a temperature in the interval of 350-450° C. in the presence of hydrogen gas, thereby converting the lignocellulosic starting material an the aqueous phase and the hydrocarbon phase.

15. A process of producing a catalyst according to claim 12, comprising the steps of
forming a first reaction mixture by mixing MoO$_3$, (NH$_4$)$_2$S, and water;
pressurizing said first mixture using hydrogen gas, heating and stirring the mixture;
forming a second mixture by adding a hydrocarbon fraction having a kinematic viscosity of less than 2.0 CSt @40° C. and NiSO$_4$ (aq.) at a suitable pressure and temperature;

pressurizing said second mixture with hydrogen gas and heating it using a suitable temperature ramp;

depressurizing said second mixture and heating the residual hydrocarbon to a suitable temperature to remove water and part of the hydrocarbon fraction; and recovering the catalyst in the form of a slurry with residual hydrocarbon.

16. A process for the conversion of a lignocellulosic starting material into an aqueous phase and a hydrocarbon phase, wherein:
   A) the lignocellulosic starting material is chosen from wood chips and/or saw dust with a dry content of >50%; forestry residue chosen from bark, and/or roots, and/or branches with a dry content of >50%; wood having been subjected to drying or a torrefaction process; lignocellulose from agriculture containing at least 50% originating from lignocellulosic matter; and mixtures thereof,
   B) an amorphous and unsupported sulfided nickel-molybdenum catalyst, and optionally C) a co-feed,
   are mixed and subjected to elevated pressure and a temperature in the interval of 350-450° C. in the presence of hydrogen gas, thereby converting the lignocellulosic starting material to the aqueous phase and the hydrocarbon phase.

17. The process according to claim 16, wherein the content of sulfur(S) in said amorphous and unsupported sulfided nickel-molybdenum catalyst with respect to the content of molybdenum (Mo) is from 0.1 to 1.0.

18. The process according to claim 16, wherein the content of nickel (Ni) in said amorphous and unsupported sulfided nickel-molybdenum catalyst with respect to the content of molybdenum (Mo) is from 0.1 to 0.2.

19. The process according to claim 16, wherein said co-feed is present, and wherein the amorphous and unsupported sulfided nickel-molybdenum catalyst is mixed with said lignocellulosic starting material in the form of a slurry of catalyst particles in said co-feed.

20. The process according to claim 16, wherein said hydrocarbon phase has an oxygen content of less than 2.5% by weight.

21. The process according to claim 16, wherein said co-feed is present and is a mixture of a vegetable oil and a liquid hydrocarbon being a fossil or renewable hydrocarbon.

* * * * *